(12) United States Patent
Nagura et al.

(10) Patent No.: US 8,532,843 B2
(45) Date of Patent: Sep. 10, 2013

(54) ENGINE AUTOMATIC CONTROL SYSTEM

(75) Inventors: Michinaga Nagura, Kariya (JP); Naoe Hashimoto, Anjo (JP)

(73) Assignee: Denso Corporation, Kariya (JP)

(*) Notice: Subject to any disclaimer, the term of this patent is extended or adjusted under 35 U.S.C. 154(b) by 199 days.

(21) Appl. No.: 13/136,287

(22) Filed: Jul. 28, 2011

(65) Prior Publication Data

US 2012/0029730 A1 Feb. 2, 2012

(30) Foreign Application Priority Data

Aug. 2, 2010 (JP) ................... 2010-173586

(51) Int. Cl.
*F02D 29/02* (2006.01)
*F02N 11/08* (2006.01)
*G08G 1/0967* (2006.01)

(52) U.S. Cl.
USPC .............................. 701/2; 701/113; 123/179.4

(58) Field of Classification Search
CPC ....................... F02N 2200/12; F02N 2200/125
USPC .................... 701/2, 113; 123/179.4
See application file for complete search history.

(56) References Cited

U.S. PATENT DOCUMENTS

| | | | |
|---|---|---|---|
| 6,442,453 B1 | 8/2002 | Fukuoka | |
| 6,463,900 B1* | 10/2002 | Wakabayashi et al. | 123/179.4 |
| 6,535,142 B2* | 3/2003 | Wakabayashi et al. | 340/929 |
| 6,629,515 B1* | 10/2003 | Yamamoto et al. | 123/179.4 |
| 8,296,030 B2* | 10/2012 | Luo et al. | 701/70 |

FOREIGN PATENT DOCUMENTS

| | | | |
|---|---|---|---|
| DE | 19621494 | * | 10/1997 |
| DE | 102008042306 A1 | * | 4/2010 |
| JP | 2000345877 A | * | 12/2000 |
| JP | 2001-109998 | | 4/2001 |
| JP | 2001-207883 | | 8/2001 |
| JP | 2002-245587 | | 8/2002 |
| JP | 2003-206781 | | 7/2003 |
| JP | 2006-31664 | | 2/2006 |
| JP | 2007-56734 | | 3/2007 |
| JP | 2008-059151 | | 3/2008 |
| JP | 2008115823 A | * | 5/2008 |
| JP | 2008309068 A | * | 12/2008 |

(Continued)

OTHER PUBLICATIONS

Office Action dated Apr. 13, 2012 in corresponding Japanese Application No. 2010-173586.

*Primary Examiner* — James Trammell
*Assistant Examiner* — David Testardi
(74) *Attorney, Agent, or Firm* — Harness, Dickey & Pierce, PLC

(57) ABSTRACT

A roadside communicator in a roadside around an intersection transmits, to vehicles around the intersection, traffic light information on traffic light at the intersection and mobile object information on vehicles and pedestrians around the intersection. An in-vehicle communicator mounted in a subject vehicle acquires the traffic light information and the mobile object information. An in-vehicle engine start determination section mounted in the subject vehicle determines a permission or prohibition of a start of an engine of the subject vehicle based on the traffic light information and mobile object information. The engine start determination section determines an engine start time in consideration of a display of the traffic light, and states of mobile objects that pass through the intersection. An in-vehicle engine control section in the subject vehicle starts the engine when the engine start determination section permits the start of the engine.

16 Claims, 13 Drawing Sheets

(56) References Cited

FOREIGN PATENT DOCUMENTS

| | | |
|---|---|---|
| JP | 2009-031968 | 2/2009 |
| JP | 2009030571 A * | 2/2009 |
| JP | 2009062845 A * | 3/2009 |
| JP | 2010138786 A * | 6/2010 |

* cited by examiner

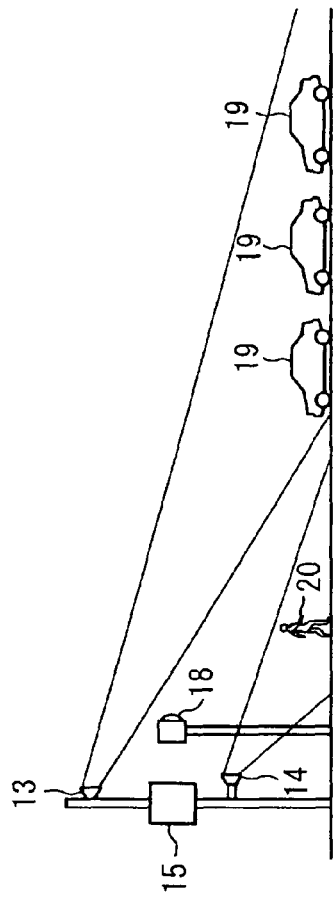
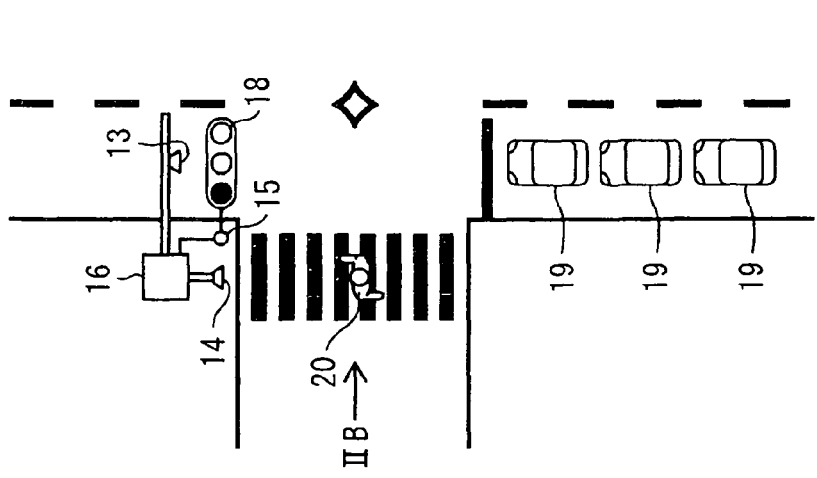

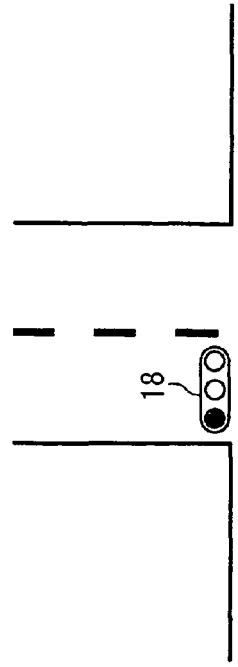
FIG. 3A
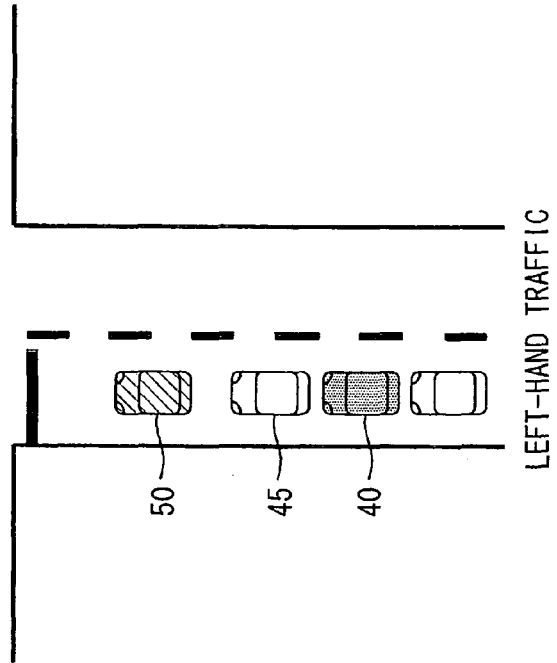
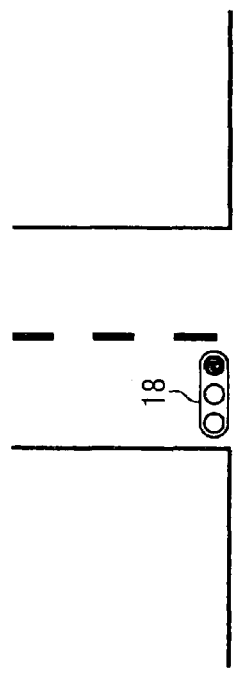
FIG. 3B
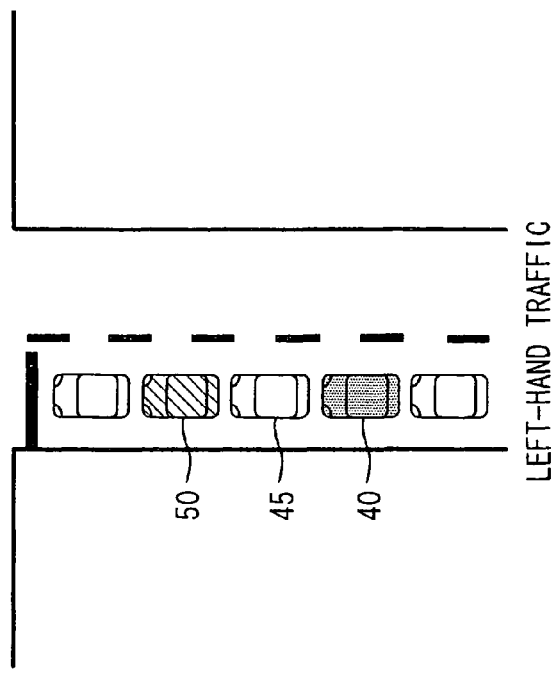

LEFT-HAND TRAFFIC

LEFT-HAND TRAFFIC

LEFT-HAND TRAFFIC

LEFT-HAND TRAFFIC

LEFT-HAND TRAFFIC

LEFT-HAND TRAFFIC

RIGHT-HAND TRAFFIC

ENGINE AUTOMATIC CONTROL SYSTEM

CROSS REFERENCE TO RELATED APPLICATION

The present application is based on and incorporates herein by reference Japanese Patent Application No. 2010-173586 filed on Aug. 2, 2010.

FIELD OF THE INVENTION

The present invention relates to an engine automatic control system which automatically stops and starts an engine of a vehicle.

BACKGROUND OF THE INVENTION

[Patent document 1] JP-2003-206781 A
[Patent document 2] JP-2001-207883 A
[Patent document 3] JP-2007-56734 A
[Patent document 4] JP-2006-316644 A In recent years, there is seen an idling stop, which stops an engine at a time when a vehicle stops, for a purpose of saving an energy and reducing an environmental load. In order to perform an idling stop effectively, it is necessary to appropriately designate a time for stopping an engine and a time for starting the engine. Such an engine stop time and an engine start time for a subject vehicle are determined conventionally based on so-called vehicle-to-vehicle communications, a distance up to an intersection, a display status of a traffic light, or a state of a preceding vehicle just ahead of the subject vehicle (refer to Patent documents 1 to 4).

Naturally, the determining of the engine start time based on the vehicle-to-vehicle communications requires each vehicle to have a vehicle-to-vehicle communications apparatus. The penetration rate of the vehicle-to-vehicle communications apparatuses is still low under the present circumstances; thus, the idling stop using the vehicle-to-vehicle communications has little practicality presently, posing a problem. In addition, if the determination of the engine start time is made only based on the distance up to the intersection or the display status of the traffic light, the engine start time may be determined regardless of the actual road traffic states. Thus, for example, even though the subject vehicle cannot start forward movement, there is a possibility that the engine may be started. Such a case causes a useless fuel to be consumed to reduce a fuel efficiency, posing a problem. In addition, if the determination of the engine start time is made based on the state of a preceding vehicle ahead of the subject vehicle, a time delay arises from when the preceding vehicle starts forward movement to when the subject vehicle starts forward movement. This poses a problem to worsen a manipulability.

SUMMARY OF THE INVENTION

It is an object of the present invention to provide an engine automatic control system which improves manipulability and fuel efficiency by stopping or starting an engine of a vehicle at a suitable time depending on a traffic state of an intersection.

To achieve the above object, according to an aspect of the present invention, an engine automatic control system is provided as follows. A roadside mobile detection device is provided at an intersection to detect a mobile object that passes through the intersection. A traffic light information acquisition device is provided to acquire traffic light information on traffic light at the intersection, the traffic light information containing a light switchover time schedule that indicates a switchover time schedule between different signals of the traffic light. A roadside information transmission device is provided at the intersection to transmit the mobile object information detected by the roadside mobile detection device and the traffic light information acquired by the traffic light information acquisition device. An in-vehicle information acquisition device is provided in a vehicle to acquire the mobile object information and the traffic light information transmitted from the roadside information transmission device. An engine start determination section is provided in the vehicle to determine a permission or a prohibition of starting an engine of the vehicle, the engine being in a stop state, based on the traffic light information and the mobile object information which are acquired by the in-vehicle information acquisition device. An engine control section is provided in the vehicle to start the engine of the vehicle, the engine being in the stop state, when the engine start determination section determines the permission of starting the engine.

That is, the engine start determination section determines an engine start time in consideration of the display status of the traffic light, the state of the mobile object such as a subject vehicle, a different vehicle, and a pedestrian, which pass through an intersection. Therefore, in cases that although the display status of the traffic light is a green signal, a subject vehicle is in a state where the subject vehicle is unable to start forward movement, the engine start determination section determines the prohibition of starting an engine, for instance. That is, the engine start determination section continues the engine stop state until a time when the subject vehicle can start forward movement. The engine control section starts the engine when the engine start determination section permits the start of the engine. This enables the engine to be started at a suitable time, thereby reducing a useless consumption of fuel. Therefore, the fuel efficiency and manipulability can be improved further.

BRIEF DESCRIPTION OF THE DRAWINGS

The above and other objects, features, and advantages of the present invention will become more apparent from the following detailed description made with reference to the accompanying drawings. In the drawings:

FIG. 2A is a diagram of a plan view illustrating an arrangement position of a roadside apparatus at an intersection in left-hand traffic according to the first embodiment;

FIG. 2B is a diagram of a side view seen from Arrow JIB in FIG. 2A;

FIG. 3A is a diagram of a plan view of a traffic light waiting state of a subject vehicle at an intersection in left-hand traffic according to the first embodiment;

FIG. 3B is a diagram of a plan view of a forward movement waiting state of a subject vehicle at an intersection in left-hand traffic according to the first embodiment;

DETAILED DESCRIPTION OF THE PREFERRED EMBODIMENTS

The following explains an engine automatic control system according to each of several embodiments of the present invention with reference to the drawings. In the present description, a pedestrian includes a person (i.e., a walking person) who exists around an intersection and a bicycle which exists around an intersection. In addition, in the present descriptions, an intersection or a traffic light device signifies an intersection or a traffic light device that is nearest from a subject vehicle that traveling a traffic lane of a road (also referred as a traveled road) in a heading direction, unless otherwise noted. Further, for instance, an intersection is formed by (i) a traveled road, which a subject vehicle traveled just up to the present time, and (ii) a cross road that intersects with the traveled road. Furthermore, an intersection is defined as containing pedestrians' crosswalks that cross over the traveled road or the cross road around the intersection. In the embodiments, a substantively identical element or configuration is assigned with an identical reference number and the duplicated explanation is omitted.

<First Embodiment>

Figure 1:
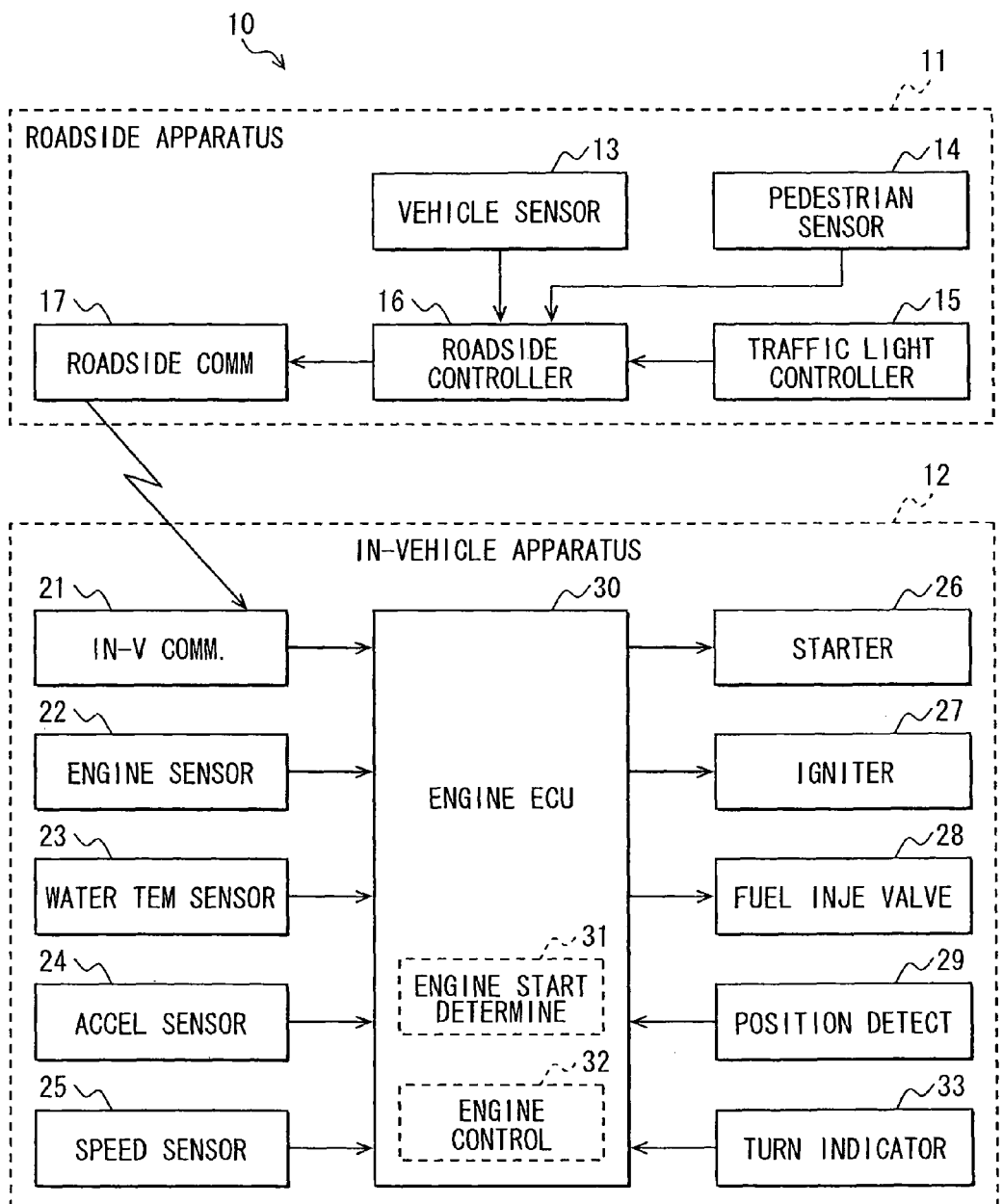
FIG. 1 is a diagram illustrating an overall configuration of an engine automatic control system according to a first embodiment of the present invention.
Figure 4:
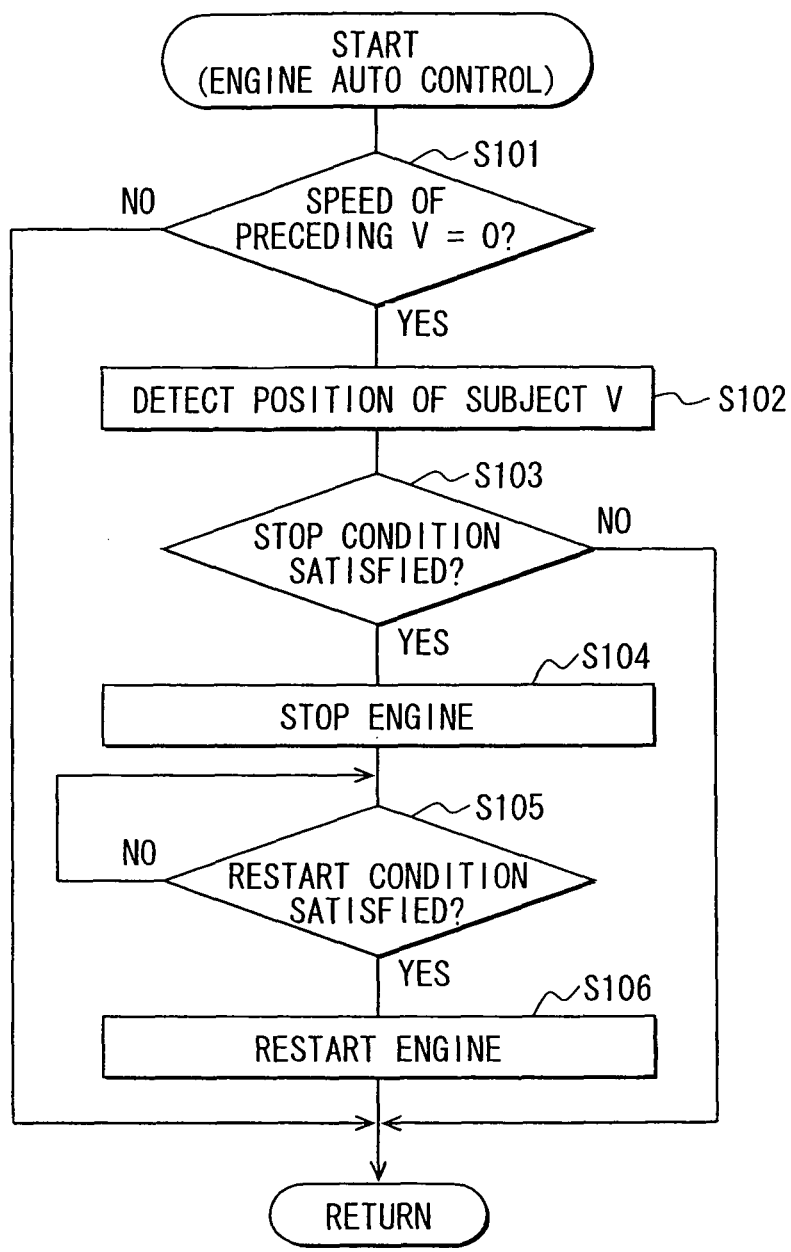
FIG. 4 is a diagram illustrating a flowchart of an engine automatic control process according to the first embodiment.

The following explains an engine automatic control system 10 according to a first embodiment of the present invention with reference to FIGS. 1 to 4. As illustrated in FIG. 1, an engine automatic control system 10 includes a roadside apparatus 11 and an in-vehicle apparatus 12 that includes various in-vehicle devices or the like. The roadside apparatus 11 is equipped with a vehicle sensor 13, a pedestrian sensor 14, a traffic light controller 15, a roadside controller 16, and a roadside communicator 17. The roadside apparatus 11 is arranged at an intersection having a traffic light device 18, as illustrated in FIG. 2A. The roadside apparatus 11 is arranged for each of traffic directions of roads forming an intersection. Therefore, for instance, in FIG. 2A, the intersection having four traffic light devices 18 is equipped with four roadside apparatuses 11. FIG. 2A illustrates one roadside apparatus 11 for one traffic direction (herein, one traffic direction has a single traffic lane) of a traveled road where vehicles 19 travel or are heading.

The vehicle sensor 13 contains, for example, an image sensor which captures an image of a vehicle 19, a distance sensor which measures a distance to the vehicle 19, and a speed sensor which detects a speed of the vehicle 19. As illustrated in FIG. 2B, the vehicle sensor 13 detects vehicle information that includes the number of vehicles 19 (a vehicle count), a distance of a vehicle 19 up to an intersection, and a speed of a vehicle 19. FIG. 2B is a schematic view seen from Arrow IIB in FIG. 2A. The vehicle sensor 13 outputs the detected vehicle information to the roadside controller 16. The vehicle sensor 13 may function as an example of a roadside mobile object detection device or means. The vehicle sensor 13 does not need to contain the whole of each abovementioned sensor. For example, the images captured by the image sensor are subjected to imaging processing; a distance and a speed of the vehicle 19 are detected from the change in the several images captured in a chronological order. In addition, in the case that a road has several traffic lanes, the vehicle sensor 13 may be provided for each traffic lane or a single vehicle sensor 13 may be provided to detect vehicles 19 in the several traffic lanes. In addition, the vehicle sensor 13 detects (i) a vehicle 19 that is going to pass through an intersection, (ii) a vehicle exiting inside of the intersection, and (iii) a vehicle which exists near the intersection after passing through the intersection. Like the vehicle sensor 13, the pedestrian sensor 14 includes, for instance, an image sensor which captures an image of a pedestrian 20, a distance sensor which measures a distance to the pedestrian 20, and a speed sensor which detects a speed of the pedestrian 20. As illustrated in FIG. 2B, the pedestrian sensor 14 detects pedestrian information that includes the number of pedestrians 20 (a pedestrian count) in a detection range, a position of the pedestrian 20, a speed of the pedestrian 20, and a heading direction of the pedestrian 20. The pedestrian sensor 14 outputs the detected pedestrian information to the roadside controller 16. The pedestrian sensor 14 may function as another example of a roadside mobile object detection device or means. The pedestrian sensor 14 does not need to contain the whole of each above-mentioned sensor. For instance, the images captured by the image sensor are subjected to an imaging process; a moving direction or a speed of a pedestrian 20 are detected from the change in the several images captured in a chronological order. The traffic light controller 15 acquires control information of the traffic light device 18; the control information includes traffic light information which contains a traffic signal switchover schedule or time of a traffic light, for instance, between the green signal, yellow signal, and red signal. The traffic light controller 15 outputs the acquired signal information to the roadside controller 16. The traffic light controller 15 may function as an example of a traffic light information acquisition device or means. The traffic light controller 15 may be integrated into a control apparatus controlling the traffic light device 18 itself.

The roadside controller 16 is electrically connected and in communication with the vehicle sensor 13, the pedestrian sensor 14, the traffic light controller 15, the roadside communicator 17. The roadside controller 16 includes a microcomputer containing a CPU, RAM, ROM, and I/O bus (none shown). The roadside controller 16 executes a computer-readable program stored in the ROM, for example, to execute information processing of information inputted from each sensor and controls of the vehicle sensor 13, the pedestrian sensor 14, and the roadside communicator 17. The roadside controller 16 prepares mobile object information based on the vehicle information inputted from the vehicle sensor 13, the pedestrian information inputted from the pedestrian sensor 14, and the traffic light information inputted from the traffic light controller 15. The prepared mobile object information is then transmitted to each vehicle 19. The roadside controller 16 prepares the mobile object information periodically. The roadside controller 16 outputs the prepared mobile object information to the roadside communicator 17 periodically every tens of milliseconds or hundreds of milliseconds, for example.

The roadside communicator 17 transmits the mobile object information prepared by the roadside controller 16 to each vehicle 19. The mobile object information includes the above-mentioned vehicle information, pedestrian information, and traffic light information. The roadside communicator 17 transmits the mobile object information, for example, by the wireless communications or beacons using such as electric waves. The roadside communicator 17 transmits the mobile object information to each vehicle 19 periodically. The roadside controller 16 and/or the roadside communicator 17 may function as an example of a roadside information transmission device or means.

The in-vehicle apparatus 12 is equipped with an in-vehicle communicator 21. In addition, the vehicle in which the in-vehicle apparatus 12 is mounted includes an engine (unshown), an engine speed sensor 22, a water temperature sensor 23, an accelerator opening sensor 24, a vehicle speed sensor 25, a starter 26, an igniter 27, a fuel injection valve 28, a position detection device 29, an engine ECU 30, and a turn indicator 33. The in-vehicle communicator 21 acquires periodically the mobile object information transmitted from the roadside communicator 17. At this time, the in-vehicle communicator 21 acquires the mobile object information from all the roadside communicators 17 provided in the intersection. That is, the in-vehicle communicator 21 mounted in a subject vehicle receives the mobile object information not only from the roadside apparatus 11 located in the heading direction of the subject vehicle, but also from the roadside apparatus 11 provided for an opposite direction or opposite lane, or a cross road that intersects with a traveled road the subject vehicle travels. The in-vehicle communicator 21 outputs the acquired mobile object information to the engine ECU 30. The in-vehicle communicator 21 may function as an example of an in-vehicle information acquisition device or means.

The engine speed sensor 22 detects the number of rotations of the engine which is not illustrated. Herein, the engine has a well-known configuration such as a gasoline engine or a diesel engine, for example. The water temperature sensor 23 detects a temperature of a cooling water which cools the engine. The accelerator opening sensor 24 detects an opening degree of an accelerator which is not illustrated. That is, the accelerator opening sensor 24 detects an amount of depressing or stepping of the accelerator (i.e., an accelerator pedal) by a driver. The accelerator opening sensor 24 may function as an example of an input device or means to detect that an accelerator (i.e., a pedal of an accelerator) is stepped in or depressed by a driver, namely, that an intension or instruction to start or activate the engine is indicated by the driver. Such an input device or means may be served as by a manipulation of a clutch pedal or shift lever, a switch input, or a sound input (none shown), for example, in addition to the accelerator opening sensor 24. The vehicle speed sensor 25 detects a speed or velocity of the subject vehicle. The starter 26 starts or activates the engine into an operation state by applying an electric current. The igniter 27 generates a voltage to be applied to a spark plug (unshown) of the engine. The fuel injection valve 28 interrupts a supply of fuel to the engine. The position detection device 29 includes a GPS receiver to detect a position of the subject vehicle. The position detection device 29 measures a present position of the subject vehicle based on signals transmitted from GPS satellites. The position detection device 29 may use a function of a position detection of a car navigation apparatus, for example. The turn indicator 33 includes a so-called blinker, for example, to display a travel direction of the subject vehicle at a time of a right turn or left turn to enable the travel direction to be visibly recognized outside of the subject vehicle. The travel direction of the subject vehicle indicated by the turn indicator 33 is sent to the engine ECU 30 as travel direction information of the subject vehicle. The engine ECU 30 connects with each above-mentioned in-vehicle device.

The engine ECU 30 includes a microcomputer containing a CPU, RAM, ROM, and I/O bus (none shown). The engine ECU 30 executes a computer-readable program stored in the ROM, for example, to control the engine based on the inputs from each in-vehicle device. The engine ECU 30 selects, from all the mobile object information received by the in-vehicle communicator 21 (i.e., the mobile object information transmitted from each of the several roadside apparatuses 11 provided at the intersection), the mobile object information which should be acquired based on the position and travel direction of the subject vehicle which are detected by the position detection device 29. The engine ECU 30 includes an engine start determination section 31 and an engine control section 32. In the present embodiment, the engine start determination section 31 and the engine control section 32 are realized as software sections using a computer-readable program executed by the engine ECU 30. Alternatively, the engine start determination section 31 and the engine control section 32 may be realized as hardware sections.

The engine ECU 30 stops the engine when a predetermined stop condition is satisfied. The engine ECU 30 stops the engine when determining that the vehicle is in a stop state (is stopping) for a duration longer than a predetermined stop determination duration based on the signals inputted from the engine speed sensor 22, the vehicle speed sensor 25, the water temperature sensor 23, etc. That is, in the present embodiment, when it is determined that the vehicle is stopping for a duration greater than the predetermined stop determination duration, the engine stop condition is fulfilled. It is noted that even in cases that the vehicle is stopping for the duration greater than the predetermined stop determination duration, the engine ECU 30 does not stop the engine when it is determined that an air-conditioner is in an operation state, for instance. The engine start determination section 31 determines whether to permit a start (i.e., restart) of the engine that was stopped by the engine ECU 30. In other words, the engine start determination section 31 determines a permission or a prohibition of starting the engine. When a predetermined restart condition is satisfied in the stop state of the engine, the engine start determination section 31 determines permitting of the start (i.e., restart) of the engine. The engine start determination section 31 determines whether to permit a start (i.e., restart) of the engine based on the mobile object information acquired by the in-vehicle communicator 21. The engine start determination section 31 may function as an example of an engine start determination means. The engine control section 32 starts the engine when the engine start determination section 31 permits the start of the engine. For instance, the engine control section 32 outputs a start signal to the starter 26, the igniter 27, and the fuel injection valve 28; thereby, the engine is started again. The engine control section 32 may function as an example of an engine control means.

The following will explain an operation of the engine automatic control system 10 having the configuration above mentioned. Here, to simplify the explanation, the engine ECU 30 is used as a main actor of the controls by the engine start determination section 31 and the engine control section 32. Further, in the present embodiment, the state where the traffic light device indicates a permission signal or a permission of an advance or forward movement to or at an intersection is referred to as a green signal; the state where the traffic light device indicates a stop signal or a stop at an intersection is referred to as a yellow signal; and the state where the traffic light device indicates a prohibition signal or a prohibition of an advance or forward movement to or at an intersection is referred to as a red signal.

FIG. 3A illustrates a state where the traffic light device 18 of an intersection in a travel direction ahead of a subject vehicle 40 indicates a red signal (i.e., the traffic light is a red signal); thereby, more than one preceding vehicle ahead of the subject vehicle 40 is in the stop state or a traffic light waiting state. In such a case, while acquiring the mobile object information periodically via the in-vehicle communicator 21, the engine ECU 30 of the subject vehicle 40 executes an engine automatic control process illustrated in FIG. 4.

It is further noted that a flowchart or the processing of the flowchart in the present application includes sections (also referred to as steps), which are represented, for instance, as S101. Further, each section can be divided into several subsections while several sections can be combined into a single section. Furthermore, each of thus configured sections can be referred to as a means or module and achieved not only as a software section in combination with a hardware device but also as a hardware section. Furthermore, the software section may be included in a software program, which may be contained in a non-transitory computer-readable storage media as a program product.

In the engine automatic control process, the engine ECU 30 determines whether a vehicle speed of a preceding vehicle is 0 (zero) based on the vehicle information included in the mobile object information acquired via the in-vehicle communicator 21 (S101). When it is determined that the vehicle speed of the preceding vehicle is not 0 (S101: NO), the processing returns. In this case, the preceding vehicle moves; there is a possibility that the subject vehicle 40 travels so as to reduce an inter-vehicular distance. Therefore, the engine ECU 30 determines that it is not necessary to execute a process for the stop and restart of the engine, thus ending the engine automatic control process.

In contrast, when determining that the vehicle speed of the preceding vehicle is zero (S101: YES) based on the acquired vehicle information, the engine ECU 30 detects or measures a present position of the subject vehicle 40 itself (S102). The engine ECU 30 detects a stop position of the subject vehicle 40 based on the measuring result by the position detection device 29 and the vehicle information acquired via the in-vehicle communicator 21. In the case of FIG. 3A, the engine ECU 30 detects that the subject vehicle 40 is located at the fourth position from an intersectional stop line. Then, the engine ECU 30 determines whether the engine stop condition is satisfied (S103). That is, the engine ECU 30 determines based on the signal from the vehicle speed sensor 25 whether the subject vehicle 40 is stopping or in a stop state. The engine ECU 30 does not execute an idling stop when the subject vehicle 40 is not in the stop state. That is, the engine ECU 30 determines that the stop condition is not satisfied when the subject vehicle is not in the stop state (S103: NO). In such a case, the engine ECU 30 returns the processing.

In contrast, in cases of determining that the subject vehicle 40 is in the stop state, the engine ECU 30 determines that the stop condition is satisfied (S103: YES) when the stop duration is longer than the predetermined stop determination duration. In such a case, the engine ECU 30 may add to the stop condition a duration up to the time when the red signal switches over to the green signal as well as the stop determination duration. The duration is contained as the traffic signal switching over schedule in the acquired traffic signal information. When determining that the stop condition is satisfied, the engine ECU 30 stops the engine (S104). That is, the engine ECU 30 executes an idling stop when the stop condition is satisfied.

Then, the engine ECU 30 determines whether the engine restart condition is satisfied (S105). In the present embodiment, the engine restart condition includes both of (i) whether the traffic light device switches over to the green signal and (ii) whether a preceding vehicle ahead of the subject vehicle 40 starts forward movement. Therefore, the engine ECU 30 determines whether the traffic light device changes over to the green signal based on the acquired traffic light information, first. The engine ECU 30 determines that the traffic light device changes over to the green signal in the case like in FIG. 3B. Then, when determining that a preceding vehicle is existing from the acquired vehicle information, the engine ECU 30 determines whether the preceding vehicle started forward movement. In this case, the engine ECU 30 determines whether a second preceding vehicle 50, which is located ahead of a first preceding vehicle 45 that is just ahead of the subject vehicle 40, started forward movement. This second preceding vehicle 50 may function as an example of a tracking target vehicle. Further, the tracking target vehicle may be assigned to not only to the second preceding vehicle but also to the third preceding vehicle or the preceding vehicle of n-th greater than the second from the subject vehicle 40, if present. The engine ECU 30 determines whether the tracking target vehicle or the second preceding vehicle 50 started forward movement based on (i) the change in the distance of the second preceding vehicle 50 up to the intersection, the distance which is included in the vehicle information, and (ii) the speed of the second preceding vehicle 50 detected by the speed sensor.

FIG. 3B illustrates the state where although the traffic light device changes over to the green signal, the second preceding vehicle 50 is still in the stop state. In such a case, the engine ECU 30 determines that the restart condition is not satisfied. That is, the engine ECU 30 determines the prohibition of the engine start (S105: NO). When determining the prohibition of the engine start, the engine ECU 30 returns the processing to S105, repeatedly determining whether the restart condition is satisfied. In contrast, when determining that the second preceding vehicle 50 started forward movement from the vehicle information, the engine ECU 30 determines that the restart condition is satisfied (S105: YES). That is, the engine ECU 30 determines the permission of the engine start (S105: YES). Then, the engine ECU 30 starts or activates the engine (S106) into the operation state. Thereby, the engine of the subject vehicle 40 can be started before the first preceding vehicle 45 just ahead of the subject vehicle 40 starts forward movement. Thus, the engine automatic control system 10 determines the engine stop time and the engine start time based on the traffic light information and the vehicle information of the mobile object information.

As explained above, the engine automatic control system 10 executes the engine start based on the traffic light information and the mobile object information. The mobile object information contains the vehicle information on vehicles which passes through the intersection. The engine ECU 30 uses as a determination basis not only the traffic light device switching over to the green signal but also the subject vehicle 40 being enabled to start forward movement. Thereby, the engine start may be prohibited when the subject vehicle 40 is still in the state where the subject vehicle 40 cannot start forward movement. Therefore, it becomes possible to restart the engine at a suitable time. Therefore, while useless fuel consumption is reducible, the manipulability of the engine automatic control system 10 can be improved. Further, when the tracking target vehicle 50, which is the n-th equal to or greater than the second when counted from the subject vehicle 40, started forward movement, the engine ECU 30 determines the permission of the engine start. Thus, the engine start is enabled to be finished or completed before the subject vehicle 40 is enabled to start forward movement, namely before the first preceding vehicle 45 just ahead of the subject vehicle 40 starts forward movement. This can cancel the time delay ranging or arising from when the subject vehicle 40 is enabled to start forward movement to when the subject vehicle 40 actually starts forward movement.

In addition, the engine ECU 30 checks whether the second preceding vehicle 50 has started forward movement based on the vehicle information. In other words, the engine ECU 30 does not estimate a duration up to a time when the subject vehicle 40 can start forward movement only based on the traffic light information that indicates the green signal, for instance, but determines whether the subject vehicle 40 can start forward movement depending on the actual traffic state or road state. Therefore, the engine ECU 30 can determine at a suitable time whether the engine start is permitted.

The detection of vehicles and pedestrians is executed by the roadside apparatus 11 using the vehicle sensor 13 and the pedestrian sensor 14. That is, the engine ECU 30 determines whether a vehicle and/or a pedestrian exists based on the detection result by the roadside apparatus 11. In this case, the engine ECU 30 may determine whether the engine start is permitted based on the mobile object information acquired by one of the vehicle sensor 13 and the pedestrian sensor 14. Thus, the image processing requiring a high load can be executed by the roadside apparatus 11; thus, the load in the processing in the engine ECU 30 can be reduced. This can improve the processing speed and responding speed of the engine ECU 30. Therefore, the engine automatic control system 10 can be provided with a good performance in the response and manipulability.

<Modification of First Embodiment>

Figure 5:
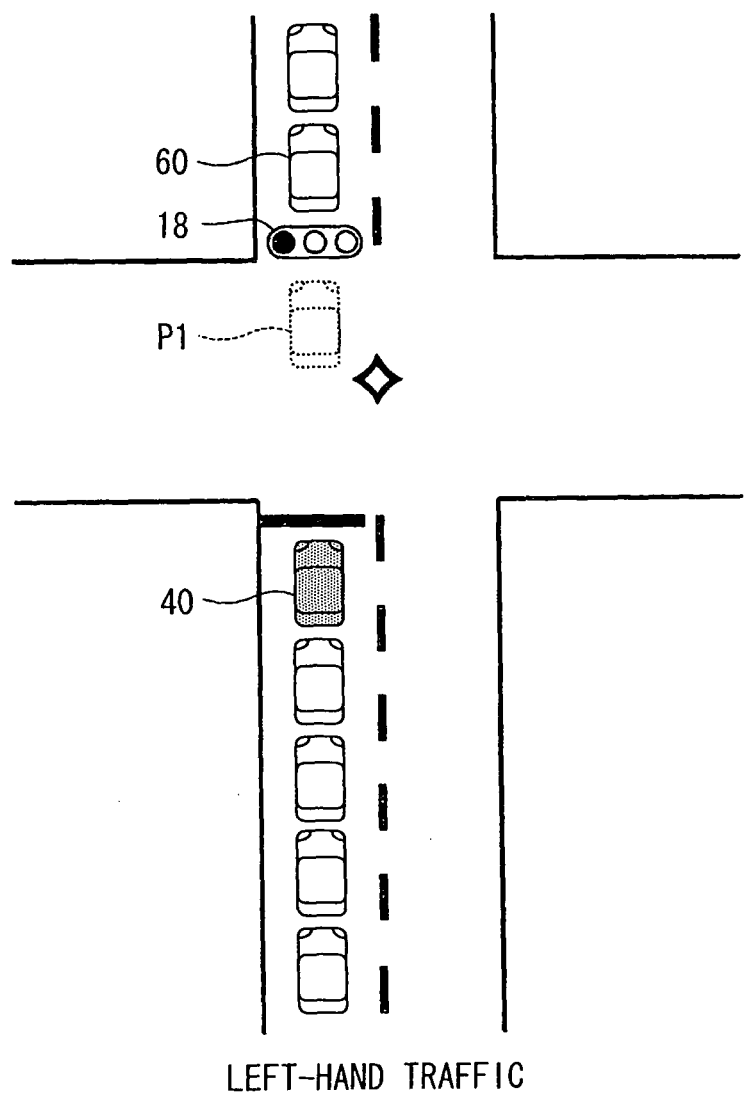
FIG. 5 is a diagram of a plan view corresponding to FIG. 3B according to a modification of the first embodiment.

An engine automatic control system 10 according to a modification of the first embodiment of the present invention is explained with reference to FIG. 5. The modification of the first embodiment is different from the first embodiment above mentioned in respect of an engine restart condition. The configuration and the flow of the processing of the engine automatic control system 10 according to the modification is similar to those of the first embodiment; thus, the explanation will be made also with reference to FIGS. 1 to 4. The modification of the first embodiment has a premise that the subject vehicle 40 is in a traffic light waiting state at the head of the vehicles waiting at the intersection. In such a case, the engine ECU 30 executes the engine automatic control process illustrated in FIG. 4 like in the first embodiment. At S101, the engine ECU 30 determines that no preceding vehicle exists ahead of the subject vehicle 40 based on the acquired vehicle information and then determines whether the vehicle speed of the subject vehicle 40 itself is zero. Then, the engine ECU 30 measures the position of the subject vehicle 40, and stops the engine when the engine stop condition is determined to be satisfied and the red signal is determined to continue for a duration longer than a predetermined duration, e.g., several seconds.

When the engine is stopped, the engine ECU 30 determines at S105 whether the engine restart condition is satisfied. In this case, the engine ECU 30 designates, as the engine restart condition, (i) the traffic signal of the traffic light device 18 switching over to the green signal and (ii) the subject vehicle 40 enabled to pass through the intersection. For example, like in FIG. 5, under the circumstance where a preceding vehicle 60 is stopping on a road just after passing through the intersection, the subject vehicle 40 is not enabled or permitted to enter the intersection. Therefore, even if the traffic light changed over to the green signal, the subject vehicle 40 would need to stop at a position P1 within the intersection. Therefore, the engine ECU 30 determines that the subject vehicle 40 is not enabled to pass through the intersection; the engine ECU 30 thus determines that the engine restart condition is not satisfied. That is, the engine ECU 30 determines the prohibition of the engine start.

On the other hand, when there is room on a road just after passing through the intersection for the subject vehicle 40, the engine ECU 30 determines that the engine restart condition is satisfied. That is, when the subject vehicle 40 switches over to the state where the subject vehicle 40 is able to pass through the intersection, the engine ECU 30 determines to permit the engine start. In this case, even if the subject vehicle 40 starts forward movement, there is no possibility of stopping within the intersection. Thus, the engine ECU 30 uses a different engine restart condition depending on the stop position of the subject vehicle 40. Thereby, the engine ECU 30 can move the engine into an operation state at a suitable time depending on a road state or a road traffic state. Therefore, more effective idling stop can be executed.

<Second Embodiment>

Figure 6A:
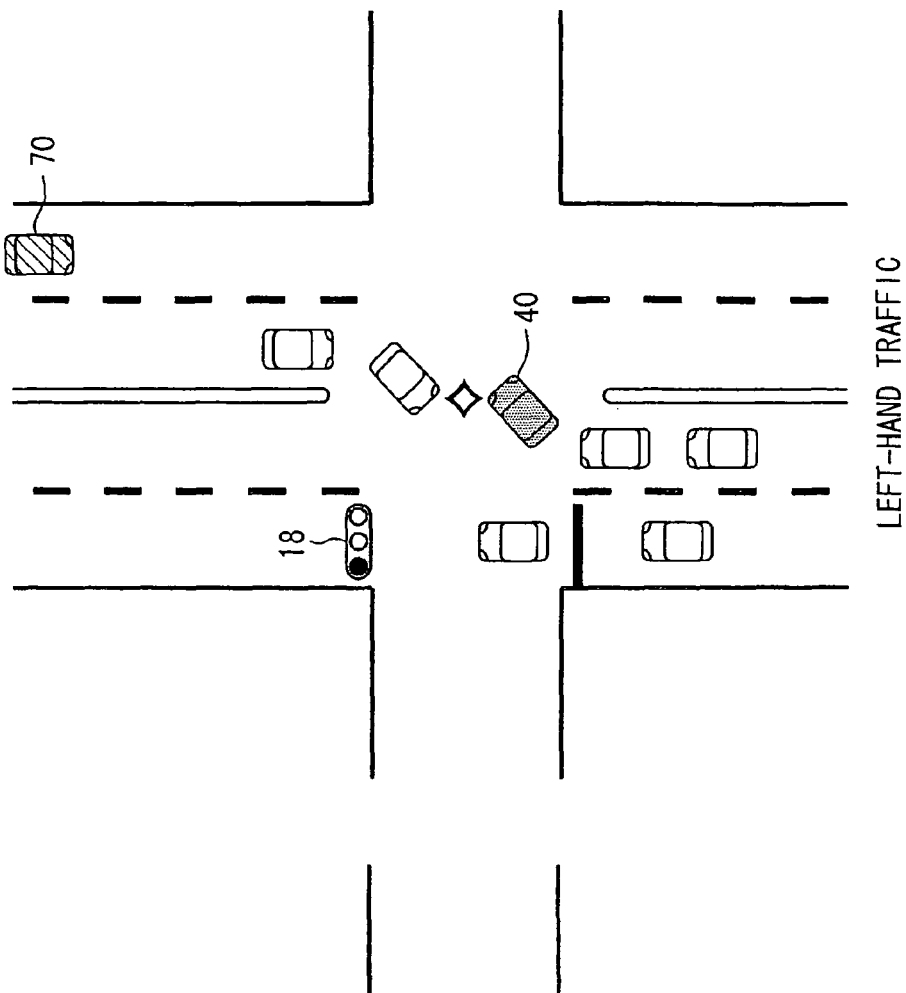
FIG. 6A is a diagram of a plan view of an oncoming vehicle existing near a subject vehicle in a right-turn waiting state at an intersection in left-hand traffic.

An engine automatic control system 10 according to a second embodiment of the present invention is explained with reference to FIGS. 6 (6A) to 11. Herein, the configuration and the flow of the processing of the engine automatic control system 10 according to the modification is almost similar to those of the first embodiment; thus, the explanation will be made also with reference to FIGS. 1 to 4. In the second embodiment, in cases that the subject vehicle 40 is waiting in an intersection so as to cross an oncoming (i.e., opposite) traffic lane to enter a cross road that intersects with a traveled road that the subject vehicle 40 traveled so far, the engine ECU 30 determines whether to permit an engine start depending on a presence of an oncoming vehicle in the oncoming traffic lane. This is equivalent to a circumstance where the subject vehicle 40 is in a right-turn waiting state in a left-hand traffic like in Japan or Great Britain, for instance as illustrated in FIG. 6A. When the subject vehicle 40 is in a right-turn waiting state, the engine ECU 30 executes the engine automatic control process illustrated in FIG. 4 to determine the engine stop time. As illustrated in FIG. 6A, even though the traffic light device 18 of the heading direction (i.e., of the present traffic lane) indicates the green light, the subject vehicle 40 cannot start forward movement or the right turn when an oncoming vehicle 70 exists around the intersection. Therefore, the engine ECU 30 determines that the engine stop condition is satisfied at S103, stopping the engine at S104. After stopping the engine, the engine ECU 30 determines whether the engine restart condition is satisfied. At this time, the engine ECU 30 executes a start condition determination process illustrated in FIG. 7 at S105. The following explains the start condition determination process depending on a road state or a road traffic state.

(No Oncoming Vehicle)

In the start condition determination process, the engine ECU 30 executes a detection as to whether there is existing an oncoming vehicle passing through or going to pass through by traveling straight the oncoming traffic lane based on the mobile object information received from the roadside apparatus 11 provided for the opposite or oncoming traffic lane (S201). The engine ECU 30 determines whether an oncoming vehicle is existing from the acquired vehicle information. When determining that no oncoming vehicle is existing (S202: NO), the engine ECU 30 executes a detection of a pedestrian (S203). The engine ECU 30 determines whether a pedestrian is existing based on the pedestrian information received from the roadside apparatus 11 for the oncoming traffic lane. When determining that there is no pedestrian crossing or going to cross the cross road (S204: NO), the engine ECU 30 determines the permission of the engine start (S206). Then the engine ECU 30 returns the processing to the engine automatic control process illustrated in FIG. 4, where the engine restart condition is satisfied (S105: YES). The engine is moved into the operation state (i.e., the engine is started) (S106).

Thus, when determining that the entrance to the cross road is permitted for the subject vehicle 40, the engine ECU 30 determines the permission of the engine start. It is noted that there may be a case where several oncoming vehicles are existing as a determination target for the engine stop condition as illustrated in FIG. 6A, the engine ECU 30 repeats the determination above-mentioned with respect to each of the several oncoming vehicles or with respect to the tail end oncoming vehicle of the several oncoming vehicles.

(Oncoming Vehicle Existing at Longer Distance)

Figure 6B:
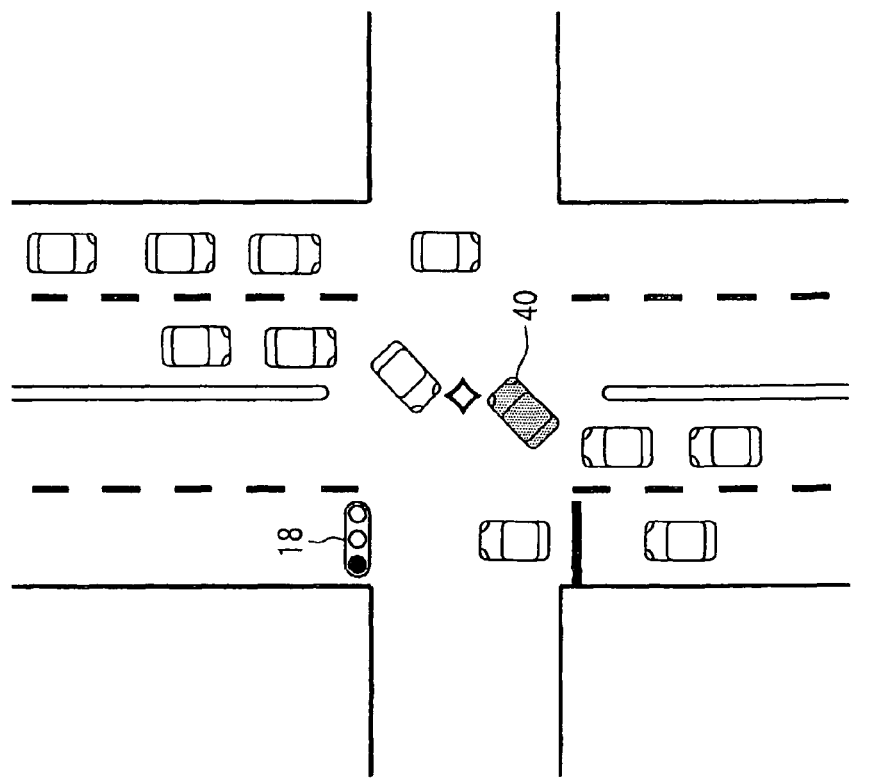
FIG. 6B is a diagram of a plan view of an oncoming vehicle existing distant from a subject vehicle in a right-turn waiting state at an intersection in left-hand traffic.
Figure 7:
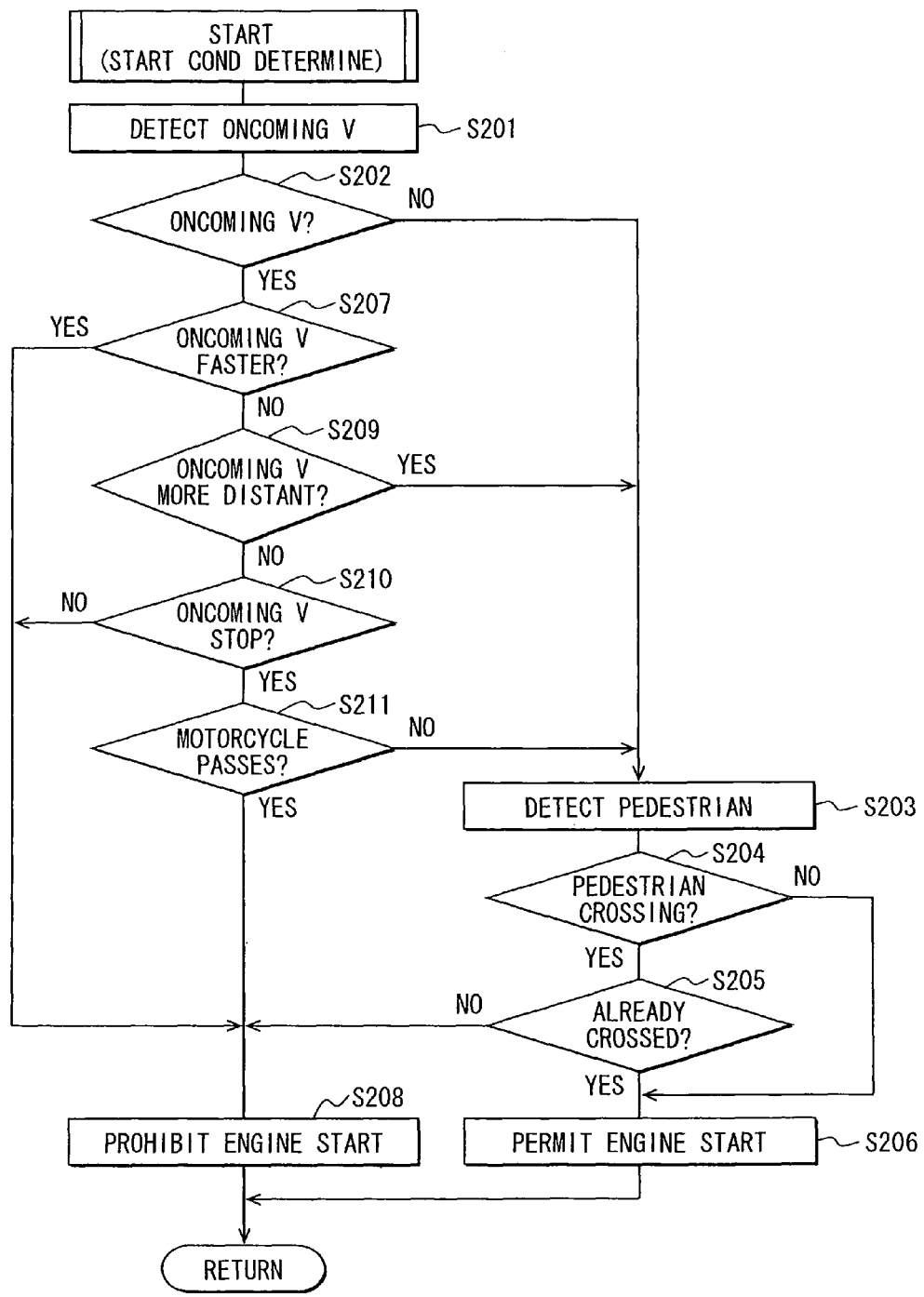
FIG. 7 is a diagram illustrating a flowchart of an engine start condition determination process according to a second embodiment of the present invention.

The following explains the case where an oncoming vehicle 70 exists at a longer distance from an intersection, as illustrated in FIG. 6B. In the start condition determination process illustrated in FIG. 7, when an oncoming vehicle 70 exists (S202: YES), the speed of the oncoming vehicle 70 is detected based on the vehicle information. The engine ECU 30 calculates an estimate of an arrival time duration of the oncoming vehicle 70 up to arriving at the intersection under the detected speed of the oncoming vehicle 70. When the speed of the oncoming vehicle 70 is faster than a predetermined value (S207: YES), the engine ECU 30 determines the prohibition of the engine start (S208). That is, when determining that the estimate of the arrival time duration is shorter than a time duration, which is necessary for the subject vehicle 40 to finish a right-turn, due to the oncoming vehicle running fast, the engine ECU 30 determines the prohibition of the engine start. Then the engine ECU 30 returns the processing to the engine automatic control process illustrated in FIG. 4, where it is determined that the engine restart condition is not satisfied (S105: NO). The determination is repeatedly executed as to whether the engine restart condition is satisfied.

In contrast, when determining that the oncoming vehicle 70 is not faster than the predetermined value (S207: NO) and simultaneously determining that the position of the oncoming vehicle 70 is at a distance longer than a predetermined value from the intersection (S209: YES), the engine ECU 30 proceeds the processing to S203. In such a case, the engine ECU 30 determines that the finishing of the right turn of the subject vehicle 40 is possible within the estimate of the arrival time duration, and then determines a presence or absence of a pedestrian at S203. When determining that no pedestrian is present, the engine ECU 30 advances the processing to S206, determining the permission of the engine start.

Figure 8:
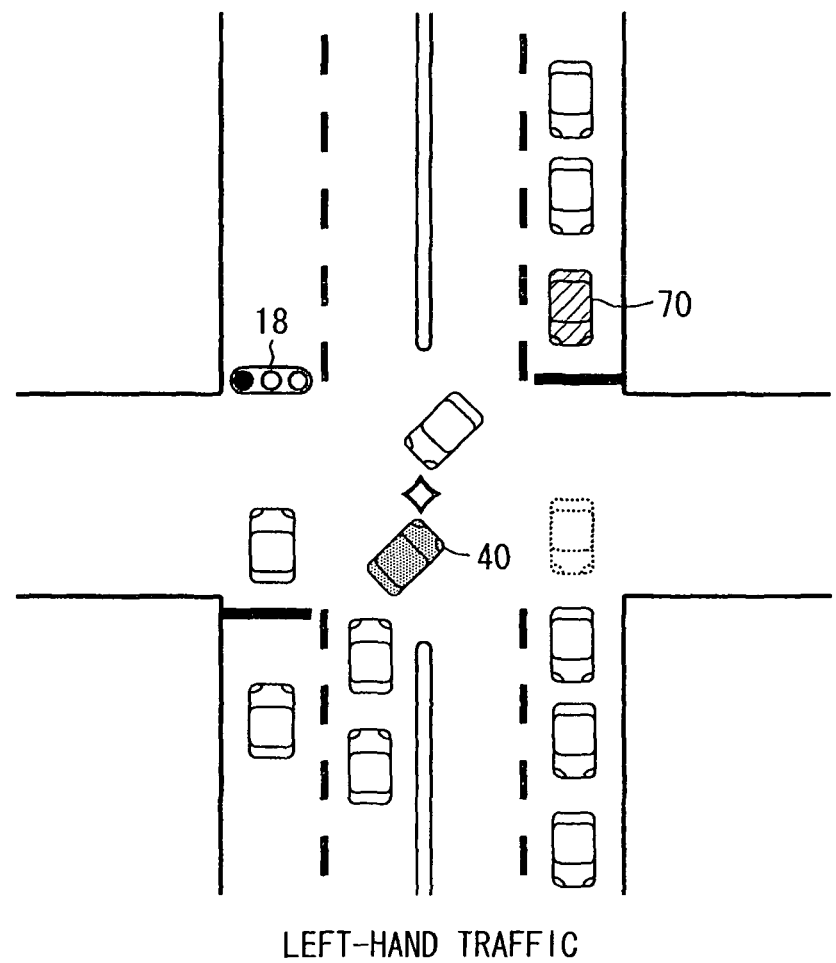
FIG. 8 is a diagram of a schematic view illustrating a first instance of a right-turn waiting state in left-hand traffic according to the second embodiment.

In contrast, when determining that the oncoming vehicle 70 is at a distance not longer than the predetermined value (S209: NO), the engine ECU 30 determines whether the oncoming vehicle 70 is going to stop (S210). For example, as illustrated in FIG. 8, although the oncoming vehicle 70 is at a position near the intersection, the oncoming vehicle 70 may not pass through the intersection due to the congestion state of a position or road just after passing through the intersection from a viewpoint of the oncoming vehicle 70. In this case, the oncoming vehicle 70 may reduce a speed and stop. In addition, also when the traffic light relative to the oncoming traffic lane changes over to the red signal, the oncoming vehicle 70 may stop. Then, the engine ECU 30 determines whether the oncoming vehicle 70 is going to stop based on the vehicle information and the traffic light information relative to the oncoming traffic lane. When determining that the oncoming vehicle 70 is going to stop (S210: YES), the engine ECU 30 determines whether there is a motorcycle passing or sneaking through (S211). Even though the oncoming vehicle 70 stops, there may be passing or sneaking through a motorcycle or a bicycle that runs a vehicular traffic lane (also referred to as a vehicle way). Therefore, the engine ECU 30 determines whether there is a motorcycle or bicycle passing through based on the acquired vehicle information relative to the ongoing traffic lane. When determining that there is no motorcycle or bicycle (S211: NO), the engine ECU 30 executes a detection of a pedestrian (S203). When detecting no pedestrian (S204: NO), the engine start is permitted (S206). Thereby, the starting forward movement of the subject vehicle 40 becomes possible. Further, the engine ECU 30 determines the prohibition of the engine start (S208), when determining that the oncoming vehicle 70 does not stop (S210: NO), or when determining that there is a possibility that a motorcycle or bicycle passes through (S211: YES).

Thus, the engine ECU 30 determines the engine start time depending on the presence or absence of the oncoming vehicle, the speed of the oncoming vehicle, the distance of the oncoming vehicle from the intersection based on the acquired vehicle information.

(Pedestrian Existing)

Figure 9:
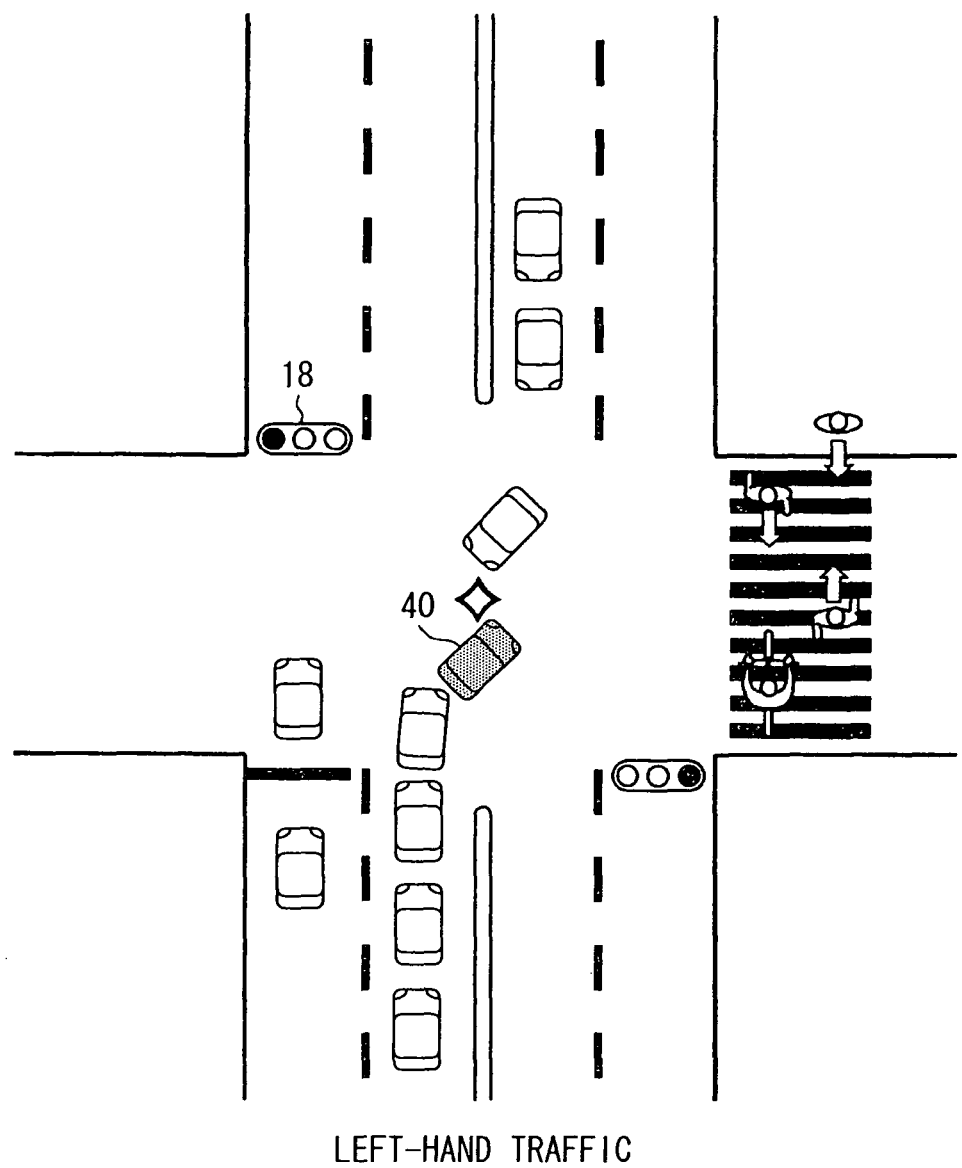
FIG. 9 is a diagram of a schematic view illustrating a second instance of a right-turn waiting state in left-hand traffic according to the second embodiment.

The following is on a premise that a pedestrian exists in a cross road which the subject vehicle 40 is going to enter. At S203 of the start condition determination process illustrated in FIG. 7, when determining from the acquired pedestrian information that a pedestrian is crossing over a crosswalk as illustrated in FIG. 9, namely, when determining that there is a pedestrian crossing or going to cross the cross road that the subject vehicle is going to enter (S204: YES), the engine ECU 30 determines that the pedestrian already finishes crossing a traffic lane of the cross road or the cross walk of the traffic lane of the cross road (S205). When determining that, as illustrated in FIG. 9, the pedestrian does not finish the crossing over (S205: NO), the engine ECU 30 determines the prohibition of the engine start (S208). That is, the engine ECU 30 does not permit the engine start when there is existing a pedestrian crossing the cross road that the subject vehicle 40 is going to enter, or when there is existing a pedestrian going to cross the cross road. This ensures the safety of the pedestrian.

Figure 10:
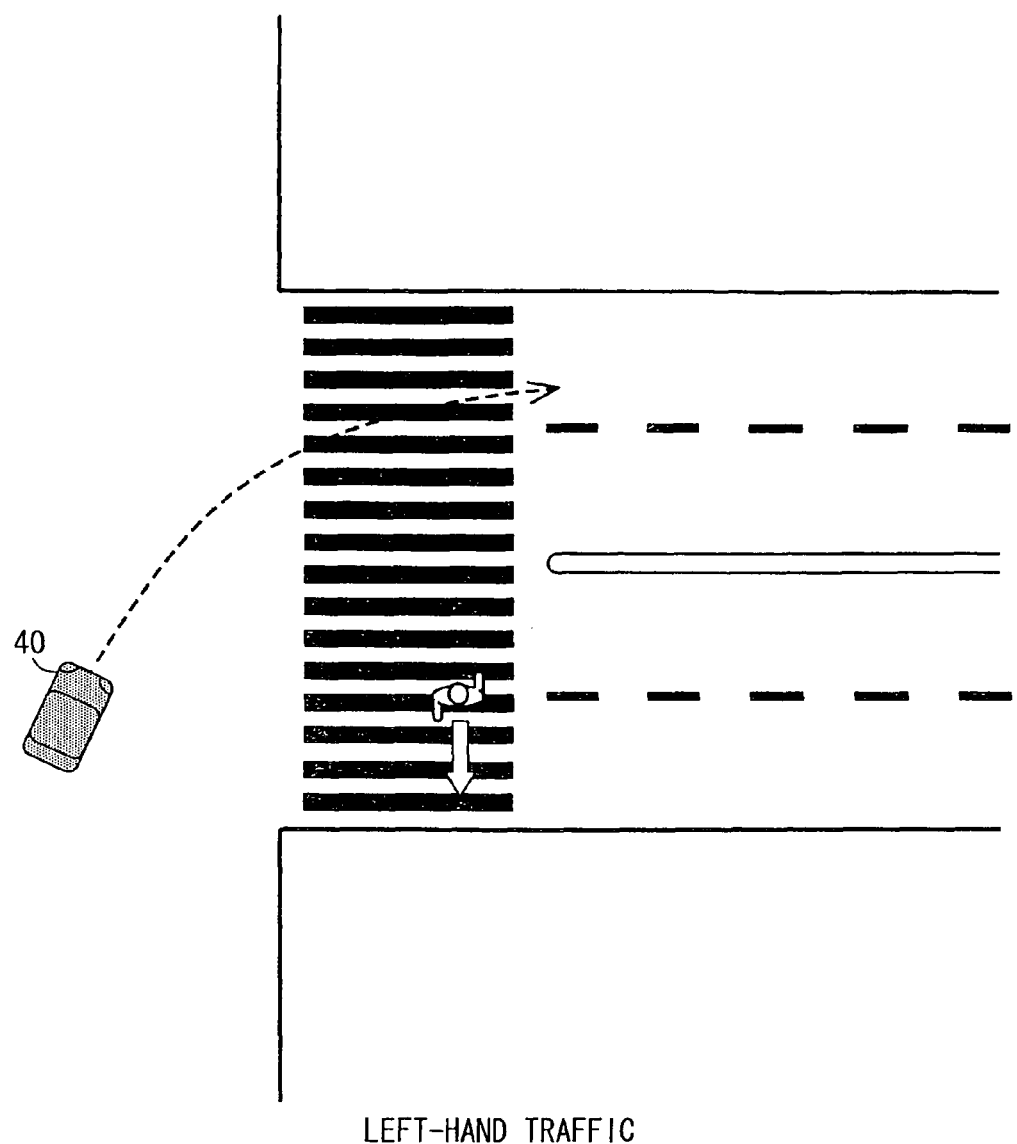
FIG. 10 is a diagram of a schematic view illustrating a first instance of a pedestrian moving over a crosswalk in left-hand traffic according to the second embodiment.

In contrast, the engine ECU 30 determines the permission of the engine start (S206) when determining that the pedestrian already finishes crossing over the traffic lane of the cross road that the subject vehicle 40 is going to enter, as illustrated in FIG. 10 (S205: YES). That is, even when the subject vehicle 40 enters the traffic lane of the cross road, the safety of the pedestrian can be secured; thus, the engine ECU 30 determines the permission of the engine start.

Figure 11:
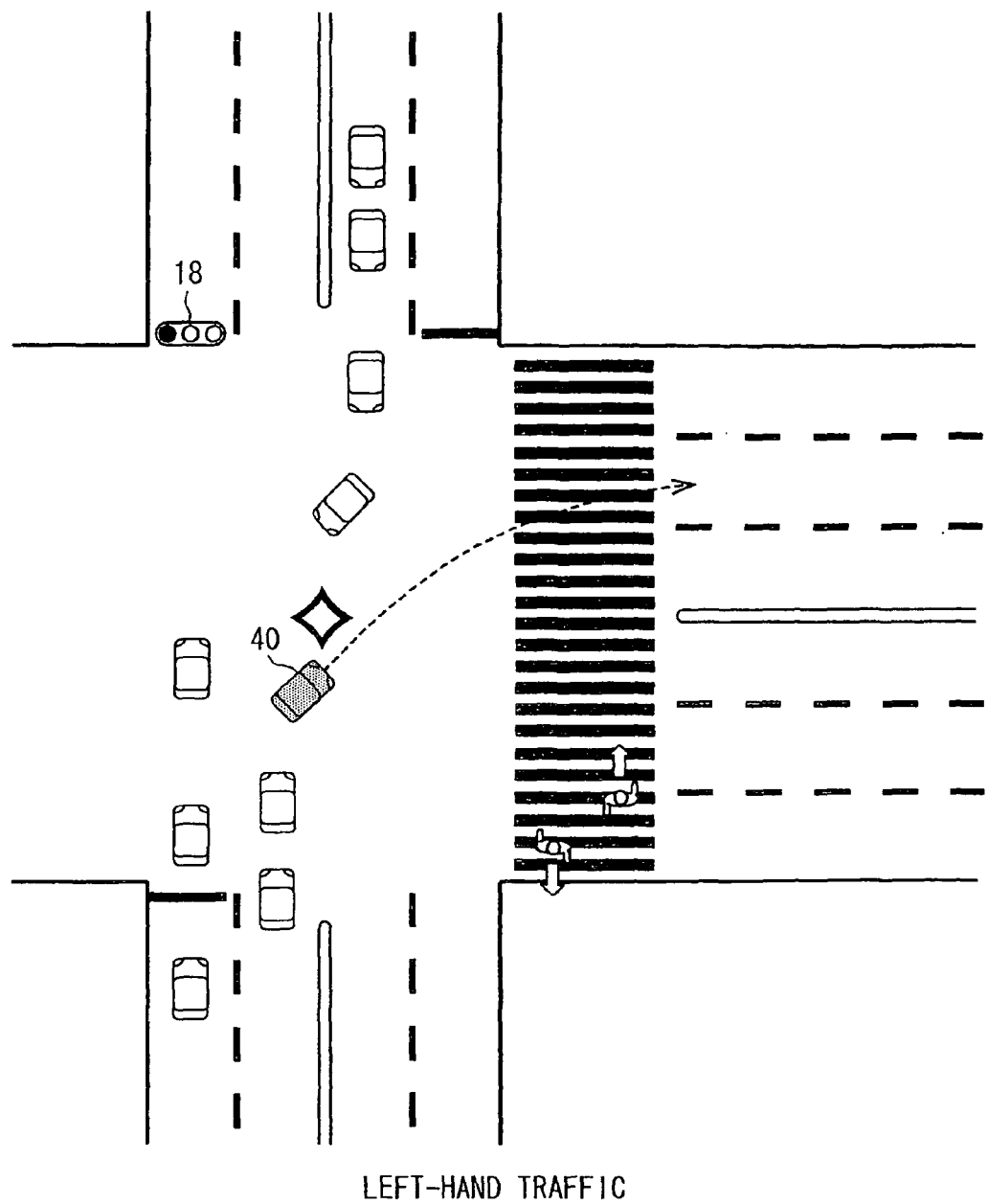
FIG. 11 is a diagram of a schematic view illustrating a second instance of a pedestrian moving over a crosswalk in left-hand traffic according to the second embodiment.

For instance, with reference to FIG. 11, in the case that there is existing a pedestrian moving towards a traffic lane of the cross road that the subject vehicle 40 is going to enter, the engine ECU 30 calculates an estimate of a time duration up to a time when the pedestrian arrives at the traffic lane that the subject vehicle 40 is going to enter. When determining that the time duration up to the time when the pedestrian arrives at the traffic lane is long enough or longer than a predetermined value, namely, when the safety of the pedestrian is determined to be secured, the engine ECU 30 determines the permission of the engine start. This corresponds to the case where in the relevant cross road having three traffic lanes, for instance, the time duration is long enough up to the time when the pedestrian reaches the traffic lane of the cross road that the subject vehicle 40 is going to enter. This enables the useless waiting time to reduce. Therefore, while enhancing the convenience, a possibility of interfering the flow of traffic can be reduced.

In contrast, in cases that although it is determined that there is existing a pedestrian based on the pedestrian information, the heading direction and speed of the pedestrian cannot be determined, the engine ECU 30 determines the prohibition of the engine start. Thereby, when there is existing a pedestrian whose heading direction and speed are unclear or unknown, the engine start is prohibited. Therefore, the safety of a pedestrian can be secured. As a matter of course, in the left-turn waiting state as well as in the right-turn waiting state, the engine restart time may be determined by determining the presence or absence of a pedestrian based on the pedestrian information. In such a case, the engine ECU 30 determines the prohibition of the engine start when there is an obstacle in a detection range of the vehicle sensor 13 or the pedestrian sensor 14 to thereby disable the determination that there is no vehicle or no pedestrian. Thereby, the safety can be improved further.

Thus, the engine ECU 30 determines the engine restart time based on at least one of the acquired vehicle information and the acquired pedestrian information. Thereby, the engine can be started or put into an operation state or activated state at a suitable time, ensuring the safety of the pedestrian.

<Third Embodiment>

Figure 12:
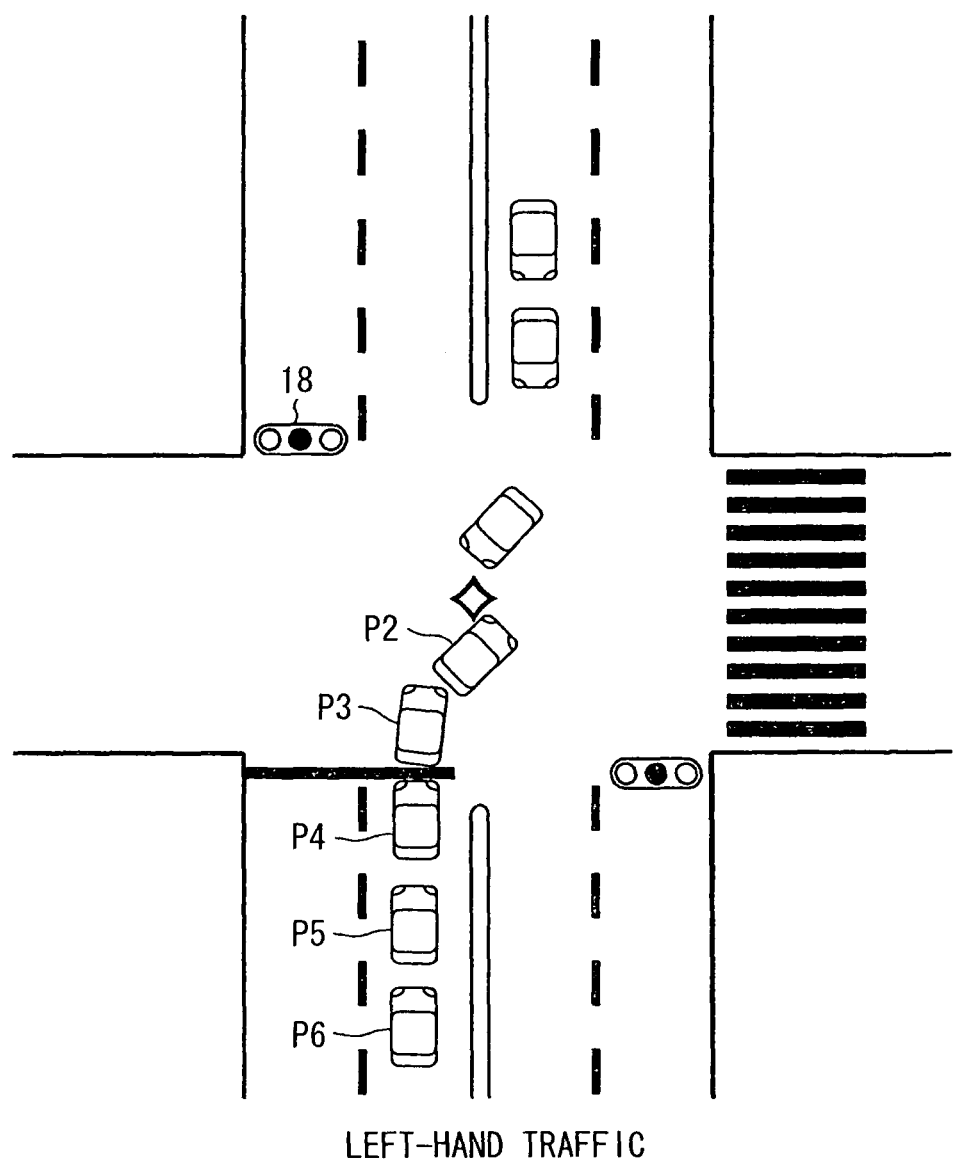
FIG. 12 is a diagram of a schematic view illustrating a a subject vehicle in a right-turn waiting state in left-hand traffic according to a third embodiment of the present invention.

An engine automatic control system 10 according to a third embodiment of the present invention is explained with reference to FIG. 12. The configuration and the flow of the processing of the engine automatic control system 10 according to the third embodiment is similar to those of the first embodiment; thus, the explanation will be made also with reference to FIGS. 1, 4, and FIG. 7. The traffic light information received from the roadside apparatus 11 contains information on traffic light switchover time schedule as well as the traffic light state. In detail, the traffic light switchover time schedule of the traffic light information indicates, for instance, the green signal continuing for 30 seconds; the yellow signal then continuing for 2 seconds; the red signal then continuing for 30 seconds; and the green signal then continuing for 30 seconds, again. In addition, the traffic light information further contains information as to whether an auxiliary entrance permission signal, for instance, a right-turn permission arrow is displayed to permit a right turn. In this case, the engine ECU 30 determines whether the engine start is permitted from a direction permitted by the auxiliary entrance permission signal, and a heading direction indicated by the turn indicator 33 of the subject vehicle 40.

For example, in cases that the turn indicator 33 of the subject vehicle 40 does not indicate any direction, i.e., the subject vehicle 40 goes straight on, the engine ECU 30 determines the permission of the engine start when it is determined that the green signal is indicated from the traffic light information. Further, in cases that the turn indicator 33 of the subject vehicle 40 indicates a right turn for the subject vehicle to turn to the right, the engine ECU 30 determines the permission of the engine start when it is determined that the green signal is indicated from the traffic light information. Further, in cases that the traffic light device indicates the yellow signal presently taking place or the red signal presently taking place, the engine ECU 30 determines the permission of the engine start when it is determined that a right-turn (green) permission arrow (also referred to as an auxiliary right-turn permission signal) to permit a right turn is indicated or displayed. Further, in cases that the turn indicator 33 of the subject vehicle 40 indicates a left turn for the subject vehicle to turn to the left, the engine ECU 30 determines the permission of the engine start when it is determined that a left-turn permission arrow (also referred to as an auxiliary left-turn permission signal) to permit a left turn is indicated or displayed.

Thus, the engine ECU 30 determines whether to permit the engine start in consideration of the heading direction indicated by the turn indicator of the subject vehicle 40 and the auxiliary entrance permission signal or arrow in the traffic light device 18, in addition to the display of the traffic light. This helps prevent the interference on the traffic and enables the engine start depending on an actual road traffic status. In such a case, as explained in the above embodiments, whether the engine start is permitted may be determined in consideration of the vehicle information and the pedestrian information.

The following explains, in detail, the circumstance where a subject vehicle 40 is in a right-turn waiting state. In cases that the subject vehicle 40 is in a right-turn waiting state at an intersection in the left-hand traffic, the engine ECU 30 determines whether the engine start is permitted based on whether the right-turn permission signal or arrow is displayed from the traffic light information, as explained above, and based on the position of the subject vehicle 40. In cases that the subject vehicle 40 is in a right-turn waiting state as shown in FIG. 12, the engine ECU 30 determines that the traffic light switched over to the yellow signal or red signal from the traffic light information. It is noted that FIG. 12 illustrates that the traffic signal indicates the yellow signal taking place. In this case, when the position of the subject vehicle 40 obtained by the vehicle information or the position detection device 29 is the position P2 or the position P3, for example, the engine ECU 30 determines the permission of the engine start. That is, when the subject vehicle 40 is located ahead of the stop line in the heading direction of the subject vehicle 40, the engine ECU 30 starts the engine even if the traffic light indicates the yellow signal or the red signal. Thereby, it becomes possible for the subject vehicle 40 to exit from the intersection promptly, and to enter the cross road.

In contrast, when the subject vehicle 40 is located at the positions P4, P5, P6, which is located short of or rear of the stop line in the heading direction of the subject vehicle 40, the engine ECU 30 determines the prohibition of the engine start. In such a case, since the traffic light is the yellow signal presently taking place, a vehicle that is located short of the stop line is prohibited from entering the intersection. When the subject vehicle 40 is located short of the stop line, the subject vehicle 40 need not move to the stop line; thereby, the engine ECU 30 prohibits the engine from starting. This can reduce useless consumption of fuel. It is noted that even when the traffic light is the red signal taking place, the engine ECU 30 determines the engine restart time with a similar procedure.

Further, when it is determined that the auxiliary right-turn permission signal or arrow is displayed from the traffic light information, like in the first embodiment, the engine ECU 30 may determine the permission of the engine start based on the confirmation of the preceding vehicle having started forward movement. For example, when the subject vehicle 40 is located in the position P4 in FIG. 12, it is expected that the right-turn is completed within the time duration for which the auxiliary right-turn permission signal or arrow is in a displayed state. In this case, when the subject vehicle 40 is located at the position P4, the engine ECU 30 determines the permission of the engine start. In contrast, although the subject vehicle 40 is stopping at the position P4 just short of the stop line, it may be determined that the right turn of the subject vehicle 40 cannot be completed within the time duration for which the auxiliary right-turn permission signal or arrow is in the displayed state because of many preceding vehicles existing inside of the intersection. In such a case, the engine ECU 30 determines the prohibition of the engine start. This can secure the safety of the subject vehicle 40.

Thus, the engine ECU 30 determines whether the engine start is permitted based on the position of the subject vehicle 40 and based on the information on the display duration contained in the traffic light information. Thereby, even in the intersection where the auxiliary right-turn permission signal or arrow is not available, the engine restart time can be determined appropriately. Naturally, in the intersection where the auxiliary right-turn permission signal or arrow is available, the engine restart time can be also determined appropriately.

Further, for example, when the driver inputs or provides an intention or instruction to start the engine, e.g., by depressing the accelerator pedal, the engine ECU 30 may permit the engine start regardless of the vehicle information or pedestrian information. For example, when the driver of an oncoming vehicle gives the right of way, or when a pedestrian indicates a permission or intention to allow the subject vehicle 40 to pass through before the pedestrian, the actual road traffic state may differ from the determination of the engine ECU 30. Thus, when the driver of the subject vehicle 40 indicates the intention or instruction to start the engine or start forward movement of the subject vehicle 40, the engine ECU 30 may determine the permission of the engine start. Thus, the driver's intention can be given the priority; the engine start is enabled to respond to the actual road traffic state. The usability can be thereby enhanced.

In cases that the engine start is intentionally demanded by the driver of the subject vehicle 40, a warning device may be provided to warn the driver of the presence of an oncoming vehicle, motorcycle, or pedestrian, the presence of which is determined based on the vehicle information or pedestrian information. The warning device may be desired to appeal to the driver's senses such as visual sense, auditory sense, or tactile sense. Although the driver exhibits an intention of starting the engine, it may be determined that a motorcycle or pedestrian is present out of the driver's sight line or in a blind angle. In such a case, the engine ECU 30 can warn the driver of such an object in a blind angle using the above warning device. Thereby, the safety can be improved further.

<Others>

Figure 13:
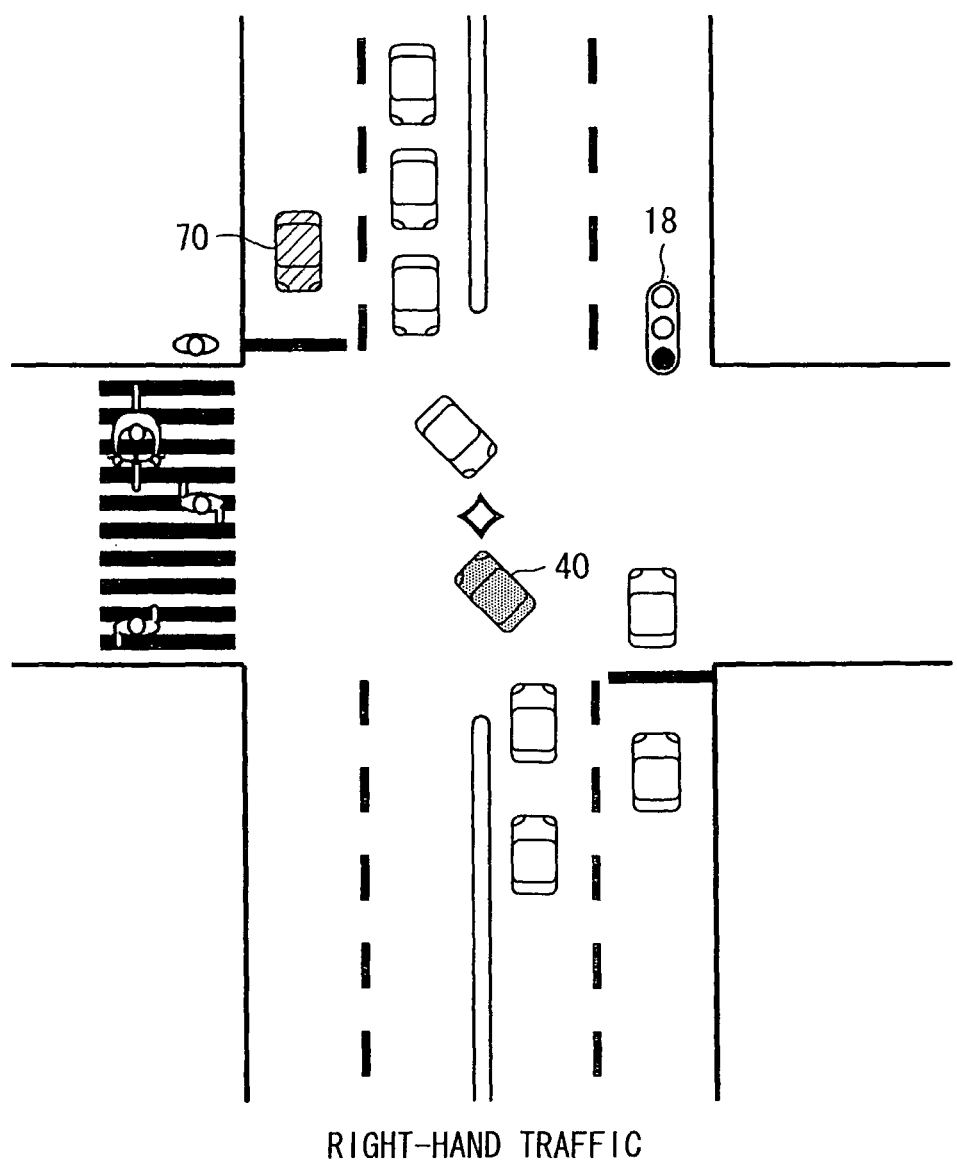
FIG. 13 is a diagram of a schematic view illustrating a subject vehicle in a left-turn waiting state in right-hand traffic according to another embodiment of the present invention.

The present invention is not limited only to the above-mentioned embodiments, and can be modified or extended as follows. The above explanation uses the left-hand traffic as an example. Naturally, the embodiment of the present invention can be applied to the right-hand traffic, which is adopted in the US. That is, as illustrated in FIG. 13, in cases that the subject vehicle 40 crosses an oncoming traffic lane to turn to the left, the engine ECU 30 executes the engine automatic control process in FIG. 4 and the start condition determination process in FIG. 7, so as to determine the permission or prohibition of the engine start. That is, even if the engine automatic control system 10 is applied to either the right-hand traffic or left-hand traffic, it can determine the engine restart time appropriately.

In the first embodiment, in cases that only one preceding vehicle is in a traffic light waiting state ahead of the subject vehicle 40, the permission of the engine start may be determined by confirming that the only one preceding vehicle starts forward movement. In the first embodiment, the engine ECU 30 determines whether the preceding vehicle 50, which is located by the length corresponding to two or more preceding vehicles ahead of the subject vehicle 40, started forward movement. However, in an actual road traffic state, it is also expected that a large space be produced between the subject vehicle 40 and the first preceding vehicle just ahead of the subject vehicle 40 depending on a driver of the subject vehicle 40. In such a case, when determining that the preceding vehicle just ahead of the subject vehicle 40 is separate from the subject vehicle 40 by a distance or length equivalent to two vehicles, the engine ECU 30 may determine the permission of the engine start when confirming the preceding vehicle just ahead of the subject vehicle having started forward movement. That is, the preceding vehicle located in the n-th order equal to or greater than the second from or ahead of the subject vehicle 40 may be defined also as a preceding vehicle stopping and separated from the subject vehicle by a distance equivalent to two vehicles or more.

Each of the engine start determination section 31 and the engine control section 32 is achieved using a software program executed by the engine ECU 30; alternatively, it may be achieved using a dedicated ECU (Electronic Control Unit). In this case, such a dedicated ECU may transmit the engine restart time to the engine ECU 30 via a communications link. Further, the communications means between the roadside communicator 17 and the in-vehicle communicator 21 is not limited to the exemplified ones in the above embodiments. As long as the data transmission of the mobile object information and/or the traffic light information can be possible, any communications means can be adopted.

Further, while the aspect of the disclosure is set out in the early part, further optional aspects of the disclosure described herein are set out as follows.

For instance, as an optional aspect, the roadside mobile detection device may detect, as the mobile object information, vehicle information which indicates a vehicle that passes through a vehicle way around the intersection.

Thereby, the engine start time can be determined, for instance, based on a heading direction, a speed, a position of the vehicle which may run a vehicle way, a vehicular road, or a traffic lane around the intersection.

As an optional aspect, the roadside mobile detection device may detect, as the mobile object information, pedestrian information which indicates a pedestrian that passes through the intersection.

Thereby, the engine start time can be determined, for instance, based on a heading direction, a speed, a position of the pedestrian who may walk on a pedestrian way of or around the intersection, such as a crosswalk of the intersection.

As an optional aspect, in cases that the engine start determination section of a subject vehicle determines, based on the traffic light information and the mobile object information, that (i) the traffic light information indicates a permission signal or a permission of entering the intersection for the subject vehicle, (ii) there are stopping preceding vehicles ahead of the subject vehicle and then (iii) a tracking target vehicle among the preceding vehicles started forward movement, the engine start determination section of the subject vehicle whose engine is in the stop state may determine the permission of starting the engine. Herein, the tracking target vehicle is defined as being positioned such that at least one preceding vehicle is sandwiched in between the tracking target vehicle and the subject vehicle.

For example, in cases that there are stopping at the intersection two or three preceding vehicles ahead of the subject vehicle, the subject vehicle cannot start forward movement immediately after the traffic light switches over to the green signal. Therefore, only when determining that the traffic light switches over to the green signal, the engine start determination section does not permit the engine start directly. In contrast, in cases of not permitting the engine start until the preceding vehicle just ahead of the subject vehicle starts forward movement, a time delay arises from when the subject vehicle can start forward movement to when the subject vehicle actually starts forward movement. Therefore, the engine start determination section regards as a tracking target vehicle a vehicle that is positioned as at least the second preceding vehicle ahead of the subject vehicle. When determining that the tracking target vehicle starts forward movement, the engine start determination section determines the permission of starting the engine of the subject vehicle. Thus, the above-mentioned time delay can be reduced.

As an optional aspect, the roadside mobile detection device may detect, as the mobile object information, a distance between a vehicle and the intersection. The engine start determination section of the subject vehicle may determine that the tracking target vehicle started the forward movement based on a distance between the intersection and the tracking target vehicle, the distance being included in the mobile object information.

That is, the engine start determination section can determine the permission of starting the engine based on not a simple estimated value but an accurate value that indicates that the tracking target vehicle actually starts forward movement.

As an optional aspect, the roadside mobile detection device may detect, as the mobile object information, a speed of a vehicle and a distance between the vehicle and the intersection. In cases that a subject vehicle is in a turn waiting state so as to cross over an oncoming traffic lane and then enter a crossroad of the intersection, the engine start determination section of the subject vehicle may calculate an estimate of an intersection arrival time duration for which an oncoming vehicle on the oncoming traffic lane, based on a distance between the intersection and the oncoming vehicle and a speed of the oncoming vehicle, the distance and the speed being included in the mobile object information, thereby determining the permission or prohibition of starting the engine based on the calculated estimate of the intersection arrival time duration.

This is equivalent to a circumstance where the subject vehicle is in a right-turn waiting state at an intersection in a left-hand traffic like in Japan or Great Britain. When an oncoming vehicle is running at a position near the intersection, there is a high possibility that the subject vehicle cannot turn to the right by the time when the oncoming vehicle arrives at the intersection. In contrast, in cases that even when an oncoming vehicle is running at a position distant from the intersection, the speed of the oncoming vehicle is fast, there is a possibility that the subject vehicle cannot turn to the right. To that end, the engine start determination section calculates the estimate of an arrival duration from the acquired mobile object information. The engine start determination section determines the prohibition of starting the engine when the estimate of the arrival duration is too short. This can reduce the possibility of the collision with the oncoming vehicle.

In addition, in the case of a right-hand traffic like in the US, the above-mentioned state corresponds to a left-turn waiting state.

As an optional aspect, in cases that a subject vehicle is in a turn waiting state so as to enter a cross road at the intersection, the engine start determination section of the subject vehicle may determine the permission or prohibition of starting the engine of the subject vehicle by determining whether there is existing a pedestrian who crosses the cross road or is expected to enter the cross road based on pedestrian information included in the mobile object information.

Further, in the above, the engine start determination section of the subject vehicle may determine the permission or prohibition of starting the engine by determining a crossing state of the pedestrian who crosses the cross road.

Thereby, the engine start can be permitted, for instance, when the pedestrian who passes through a crosswalk finishes crossing over a cross road that the subject vehicle is going to enter. For instance, the crossing state may indicate how far the pedestrian crosses the cross walk or where the pedestrian is positioned at the present time.

As an optional aspect, in cases that although the engine start determination section of a subject vehicle determines a presence of at least one of a different vehicle and a pedestrian to enter the intersection, the engine start determination section is unable to identify a speed or distance of the at least one, the engine start determination section may determine the prohibition of starting the engine.

As an optional aspect, a turn indicator may be provided in a vehicle to indicate a turn direction of the vehicle. In cases that the traffic light information indicates an auxiliary entrance permission signal to permit an auxiliary entrance to a predetermined turn direction at the intersection while indicating a prohibition signal or a prohibition of entering the intersection, the engine start determination section of a subject vehicle may determine the permission or prohibition of starting the engine of the subject vehicle based on the turn direction indicated by the turn indicator of the subject vehicle and the predetermined turn direction permitted by the auxiliary entrance permission signal indicated by the traffic light information.

Thus, in cases that even when the traffic light device indicates the green signal, a green permission arrow is also indicated by the traffic light, the engine can be appropriately started.

As an optional aspect, in cases that the traffic light information indicates a prohibition signal prohibiting the vehicle from entering the intersection while indicating no auxiliary entrance permission signal to permit an auxiliary entrance to a predetermined turn direction of the intersection, the engine start determination section of a subject vehicle may determine the prohibition of starting the engine of the subject vehicle when determining that a position of the subject vehicle specified from the mobile object information is located short of a stop line before entering the intersection.

As an optional aspect, an input device may be provided in a vehicle to input an instruction to restart the engine from a driver of the vehicle. In cases that the input device of a subject vehicle inputs an instruction to restart the engine of the subject vehicle, the engine start determination section of the subject vehicle may determine the permission of starting the engine of the subject vehicle even when determining the prohibition of the starting the engine of the subject vehicle based on the traffic light information and the mobile object information.

For example, when the oncoming vehicle yields the way, the determination based on mobile object information may differ from the determination by the driver. Thus, when the driver of the subject vehicle indicates the intention or instruction to start the engine or start forward movement of the subject vehicle, the engine start determination section determines the permission of the engine start. Thereby, according to the actual traffic state in the intersection, the engine can be started appropriately.

It will be obvious to those skilled in the art that various changes may be made in the above-described embodiments of the present invention. However, the scope of the present invention should be determined by the following claims.

What is claimed:

1. An engine automatic control system comprising:
   a roadside mobile detection device provided at an intersection of a road to detect, as mobile object information, information of a mobile object that passes through the intersection;
   a traffic light information acquisition device to acquire traffic light information of a traffic light provided at the intersection, the traffic light information containing a light switchover time schedule;
   a roadside information transmission device provided at the intersection to transmit the mobile object information detected by the roadside mobile detection device and the traffic light information acquired by the traffic light information acquisition device;
   an in-vehicle information acquisition device provided in a vehicle to acquire the mobile object information and the traffic light information transmitted from the roadside information transmission device;
   an engine start determination section provided in the vehicle to determine a permission or a prohibition of starting an engine of the vehicle, the engine being in a stop state, based on the traffic light information and the mobile object information which are acquired by the in-vehicle information acquisition device;
   an engine control section provided in the vehicle to start the engine when the engine start determination section determines the permission of starting the engine; and
   a turn indicator provided in the vehicle to indicate a turn direction of the vehicle, wherein:
   the roadside mobile detection device is configured to detect, as the mobile object information, vehicle information which indicates a vehicle that passes through the intersection along a traffic lane;
   the roadside information transmission device is configured to transmit the vehicle information as the mobile object information;
   the in-vehicle information acquisition device is configured to acquire the vehicle information as the mobile object information;
   the engine start determination section is configured to determine the permission or prohibition of starting the engine, which is in the stop state, based on the traffic light information and the vehicle information;
   the roadside mobile detection device is configured to detect, as the mobile object information, pedestrian information which indicates a pedestrian that passes through the intersection along a crosswalk;
   the roadside information transmission device is configured to transmit the pedestrian information as the mobile object information;
   the in-vehicle information acquisition device is configured to acquire the pedestrian information as the mobile object information;
   the engine start determination section is configured to determine the permission or prohibition of starting the engine, which is in the stop state, based on the traffic light information and the pedestrian information;
   the engine start determination section is configured to determine the permission of starting the engine when the engine start determination section determines, based on the mobile object information, that there are a plurality of preceding vehicles ahead of a subject vehicle and there is a tracking target vehicle which has started forward movement toward the intersection under a condition that the traffic light information indicates a permission signal, the tracking target vehicle being at least a second preceding vehicle counted from the subject vehicle;
   the roadside mobile detection device is configured to detect, as the mobile object information, a distance between each of the preceding vehicles and the intersection;
   the engine start determination section is configured to determine that the tracking target vehicle started the forward movement based on the distance between the intersection and each of the preceding vehicles, the distance being included in the mobile object information;
   in cases that the subject vehicle is in a turn waiting state so as to cross over an oncoming traffic lane and then enter a cross road of the intersection,
   the engine start determination section
   is configured to calculate an estimate of an intersection arrival time duration for an oncoming vehicle running along the oncoming traffic lane, based on a distance between the intersection and the oncoming vehicle and a speed of the oncoming vehicle, the distance and the speed being included in the mobile object information, and
   to determine the permission or prohibition of starting the engine based on the calculated estimate of the intersection arrival time duration;
   in cases that the traffic light information indicates an auxiliary entrance permission signal to permit an auxiliary entrance while indicating a stop signal or a prohibition signal, the engine start determination section is configured to determine the permission or prohibition of starting the engine based on the turn direction indicated by the turn indicator of the subject vehicle and a predetermined turn direction permitted by the auxiliary entrance permission signal; and
   in cases that the subject vehicle is in the turn waiting state so as to cross over the oncoming traffic lane and then enter the cross road of the intersection and the traffic light information indicates a stop signal and the prohibition signal while indicating no auxiliary entrance permission signal, the engine start determination section is configured to determine the prohibition of starting the engine when determining that a position of the subject vehicle specified from the mobile object information is located short of a stop line before entering the intersection.

2. The engine automatic control system according to claim 1,
   wherein, in cases that the subject vehicle is in the turn waiting state so as to enter the cross road at the intersection,
   the engine start determination section is configured to determine the permission or prohibition of starting the engine by determining whether there is existing a pedestrian who crosses the cross road or is expected to enter the cross road based on the pedestrian information included in the mobile object information.

3. The engine automatic control system according to claim 2, wherein the engine start determination section is configured to determine the permission or prohibition of starting the engine by determining a crossing state of the pedestrian who crosses the cross road.

4. The engine automatic control system according to claim 1, wherein the engine start determination section is configured to determine the prohibition of starting the engine when the engine start determination section fails to specify a speed or distance of a different vehicle and a pedestrian to enter the intersection from the mobile object information.

5. The engine automatic control system according to claim 1, further comprising:
an input device to input an instruction to restart the engine from a driver of the vehicle,
wherein, in cases that the input device inputs the instruction to restart the engine, the engine start determination section is configured to determine the permission of starting the engine even when determining the prohibition of the starting the engine based on the traffic light information and the mobile object information.

6. The engine automatic control system according to claim 1, wherein, in cases that the engine start determination section determines that the subject vehicle is in the turn waiting state so as to cross over the oncoming traffic lane and then enter the cross road of the intersection, the traffic light information indicates the stop signal and the prohibition signal while indicating no auxiliary entrance permission signal, and the position of the subject vehicle specified from the mobile object information is located short of the stop line before entering the intersection, the engine start determination section is configured to determine the permission of starting the engine when the engine start determination section determines that the traffic light information switches over from the no auxiliary entrance permission signal to the auxiliary entrance permission signal.

7. The engine automatic control system according to claim 1, wherein:
the light switchover time schedule indicates a switchover time schedule between different signals of the traffic light;
in cases that the engine start determination section of the subject vehicle determines, based on the traffic light information and the mobile object information, that (i) the traffic light information indicates the permission signal permitting of entering the intersection for the subject vehicle, (ii) there are stopping preceding vehicles ahead of the subject vehicle and then (iii) the tracking target vehicle among the preceding vehicles started forward movement, the tracking target vehicle being positioned such that at least one preceding vehicle is sandwiched in between the tracking target vehicle and the subject vehicle,
the engine start determination section of the subject vehicle is configured to determine the permission of starting the engine;
the roadside mobile detection device is configured to detect, as the mobile object information, the distance between each of the proceeding vehicles and the intersection;
the engine start determination section of the subject vehicle is configured to determine that the tracking target vehicle started the forward movement based on the distance between the intersection and the tracking target vehicle, the distance being included in the mobile object information;
the roadside mobile detection device is configured to detect, as the mobile object information, the speed of the oncoming vehicle and the distance between the oncoming vehicle and the intersection;
in cases that the subject vehicle is in the turn waiting state so as to cross over the oncoming traffic lane and then enter the cross road of the intersection,
the engine start determination section of the subject vehicle is configured to calculate the estimate of the intersection arrival time duration for which the oncoming vehicle on the oncoming traffic lane, based on the distance between the intersection and the oncoming vehicle and the speed of the oncoming vehicle, the distance and the speed being included in the mobile object information, and to determine the permission or prohibition of starting the engine based on the calculated estimate of the intersection arrival time duration;
in cases that the traffic light information indicates the auxiliary entrance permission signal to permit the auxiliary entrance to the predetermined turn direction at the intersection while indicating the prohibition signal to prohibit the vehicle from entering the intersection, the engine start determination section of the subject vehicle is configured to determine the permission or prohibition of starting the engine of the subject vehicle based on the turn direction indicated by the turn indicator of the subject vehicle and the predetermined turn direction permitted by the auxiliary entrance permission signal indicated by the traffic light information; and
in cases that the traffic light information indicates the prohibition signal prohibiting the vehicle from entering the intersection while indicating no auxiliary entrance permission signal to permit the auxiliary entrance to the predetermined turn direction of the intersection, the engine start determination section of the subject vehicle is configured to determine the prohibition of starting the engine of the subject vehicle when determining that the position of the subject vehicle specified from the mobile object information is located short of the stop line before entering the intersection.

8. The engine automatic control system according to claim 1, wherein, in cases that although the engine start determination section of the subject vehicle determines the presence of at least one of the different vehicle and the pedestrian to enter the intersection, and the engine start determination section is unable to identify the speed or the distance of the at least one, the engine start determination section is configured to determine the prohibition of starting the engine.

9. The engine automatic control system according to claim 1, further comprising:
a position detection device provided in the subject vehicle to detect a present position of the subject vehicle,
wherein the engine start determination section of the subject vehicle is configured to detect, how many preceding vehicles, which are in a traffic light waiting state, precede ahead of the subject vehicle by identifying the present position of the subject vehicle detected by the position detection device of the subject vehicle among vehicles indicated by the mobile object information.

10. The engine automatic control system according to claim 1,
wherein, in cases that based on the mobile object information it is determined that the subject vehicle needs to stop inside of the intersection before passing through the intersection because it is determined that there is no room at a position after passing through the intersection,
the engine start determination section of the subject vehicle is configured to determine the prohibition of starting the engine of the subject vehicle.

11. The engine automatic control system according to claim 1,
wherein, in cases that it is determined that the oncoming vehicle stops short of the intersection before entering the intersection based on the traffic light information relative to the oncoming traffic lane,
the engine start determination section of the subject vehicle is configured to determine the permission of starting the engine of the subject vehicle.

12. The engine automatic control system according to claim 1,
wherein, in cases that it is determined based on the mobile object information that the oncoming vehicle stops before entering the intersection due to a traffic state at a position after entering the intersection, the traffic state disabling a passage of the intersection by the oncoming vehicle,
the engine start determination section of the subject vehicle is configured to determine the permission of starting the engine of the subject vehicle.

13. The engine automatic control system according to claim 1,
wherein, in cases that it is determined that the pedestrian already finishes crossing over a traffic lane of the cross road to which the subject vehicle is entering,
the engine start determination section of the subject vehicle is configured to determine the permission of starting the engine of the subject vehicle.

14. The engine automatic control system according to claim 1, wherein:
the engine start determination section of the subject vehicle is configured to calculate an arrival time duration for which the pedestrian arrives at a traffic lane of the cross road to which the subject vehicle is going to enter; and
in cases that it is determined that the calculated arrival time duration of the pedestrian is long enough to secure a safety of the pedestrian even when the subject vehicle enters the traffic lane of the cross road,
the engine start determination section of the subject vehicle is configured to determine the permission of starting the engine of the subject vehicle.

15. The engine automatic control system according to claim 1,
wherein, in cases that the subject vehicle is stopping at a position short of the stop line before entering the intersection in a left turn waiting state in a right-hand traffic,
the engine start determination section of the subject vehicle is configured to determine the prohibition of starting the engine of the subject vehicle when it is determined that the subject vehicle is unable to finish a left turn within a time duration for which an auxiliary left-turn permission signal is being displayed because of the preceding vehicles existing inside of the intersection.

16. The engine automatic control system according to claim 1,
wherein, in cases that the subject vehicle is stopping at a position short of the stop line before entering the intersection in a right turn waiting state in a left-hand traffic,
the engine start determination section of the subject vehicle is configured to determine the prohibition of starting the engine of the subject vehicle when it is determined that the subject vehicle is unable to finish a right turn within a time duration for which an auxiliary right-turn permission signal is being displayed because of the preceding vehicles existing inside of the intersection.

\* \* \* \* \*